(12) United States Patent
Maeda et al.

(10) Patent No.: US 8,180,541 B2
(45) Date of Patent: May 15, 2012

(54) DRIVE AND BRAKING FORCE CONTROL DEVICE FOR VEHICLE

(75) Inventors: Yoshinori Maeda, Aichi-gun (JP); Kazuya Okumura, Suntou-gun (JP); Michitaka Tsuchida, Susono (JP); Yoshio Uragami, Mishima (JP); Kensuke Yoshizue, Susono (JP); Satoshi Ando, Fuji (JP); Koji Sugiyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1045 days.

(21) Appl. No.: 11/815,268

(22) PCT Filed: Feb. 2, 2006

(86) PCT No.: PCT/JP2006/302213
§ 371 (c)(1),
(2), (4) Date: Apr. 2, 2008

(87) PCT Pub. No.: WO2006/083013
PCT Pub. Date: Aug. 10, 2006

(65) Prior Publication Data
US 2009/0012685 A1    Jan. 8, 2009

(30) Foreign Application Priority Data
Feb. 2, 2005 (JP) .................................. 2005-26770

(51) Int. Cl.
*B60T 8/1755* (2006.01)
(52) U.S. Cl. .......................................... 701/70; 303/146

(58) Field of Classification Search ............... 701/70, 701/72, 78, 79, 80; 303/138–140, 143, 146–149; 180/197, 275, 282
See application file for complete search history.

(56) References Cited

U.S. PATENT DOCUMENTS 5,702,165 A * 12/1997 Koibuchi ..................... 303/146
5,752,752 A * 5/1998 Tozu et al. ................... 303/146
(Continued)

FOREIGN PATENT DOCUMENTS
JP          8 310366          11/1996
(Continued)

OTHER PUBLICATIONS

U.S. Appl. No. 11/916,073, filed Nov. 30, 2007, Uragami, et al.
U.S. Appl. No. 12/097,629, filed Jun. 16, 2008, Meada, et al.

*Primary Examiner* — Thomas Black
*Assistant Examiner* — Ce Li
(74) *Attorney, Agent, or Firm* — Oblon, Spivak, McClelland, Maier & Neustadt, L.L.P.

(57) ABSTRACT

In a braking/driving force control apparatus, a vehicle target braking/driving force and a vehicle target yaw moment through the control of braking/driving forces of wheels are calculated, and when the target braking/driving force and the target yaw moment cannot be achieved through the control of the braking/driving forces of the wheels, it is determined which one of the braking/driving force and the yaw moment should take priority on the basis of the target braking/driving force and the target yaw moment. When it is determined that the braking/driving force should take priority, the braking/driving forces of the wheels are controlled so as to attain the target braking/driving force as much as possible, and when it is determined that the yaw moment should take priority, the braking/driving forces of the wheels are controlled so as to attain the target yaw moment as much as possible.

12 Claims, 11 Drawing Sheets

U.S. PATENT DOCUMENTS

| | | | |
|---|---|---|---|
| 6,059,067 A * | 5/2000 | Shibahata et al. | 180/338 |
| 6,089,680 A * | 7/2000 | Yoshioka et al. | 303/146 |
| 6,415,215 B1 * | 7/2002 | Nishizaki et al. | 701/70 |
| 7,698,032 B2 * | 4/2010 | Matsumoto et al. | 701/36 |
| 2002/0014799 A1 * | 2/2002 | Nagae | 303/139 |
| 2002/0075139 A1 * | 6/2002 | Yamamoto et al. | 340/436 |
| 2002/0109402 A1 * | 8/2002 | Nakamura | 303/146 |
| 2003/0102713 A1 * | 6/2003 | Murakami | 303/146 |
| 2004/0128044 A1 * | 7/2004 | Hac | 701/48 |
| 2005/0023895 A1 * | 2/2005 | Yasutake et al. | 303/146 |
| 2006/0149445 A1 * | 7/2006 | Suzumura et al. | 701/41 |

FOREIGN PATENT DOCUMENTS

| | | |
|---|---|---|
| JP | 9 309357 | 12/1997 |
| JP | 2000 168525 | 6/2000 |
| JP | 2000 190832 | 7/2000 |
| JP | 2000 344077 | 12/2000 |
| JP | 2002 46589 | 2/2002 |
| JP | 2002 178904 | 6/2002 |
| JP | 2002 211378 | 7/2002 |
| JP | 2005 255107 | 9/2005 |

* cited by examiner

DRIVE AND BRAKING FORCE CONTROL DEVICE FOR VEHICLE

TECHNICAL FIELD

The present invention relates to a vehicle braking/driving force control apparatus, and more particularly to a vehicle braking/driving force control apparatus that controls braking/driving force of each wheel.

BACKGROUND ART

As one of braking/driving force control apparatuses for a vehicle, such as an automobile, there has conventionally been known a driving force control apparatus, as disclosed in Japanese Unexamined Patent Application No. HEI9-309357 for example, for performing a distribution control of driving force applied to left and right wheels so as to exert a required yaw moment to a vehicle. Further, there has already been known a braking force control apparatus that controls a vehicle braking/driving force and yaw moment by controlling braking forces of wheels so as to secure a vehicle running stability. This braking/driving force control apparatus can enhance running stability of a vehicle.

In general, the vehicle braking/driving force and yaw moment can be controlled through the control of the braking/driving forces of the wheels. However, there is a limitation in the braking/driving force that can be generated by each wheel. Therefore, there may be the case in which the braking/driving force and/or yaw moment required to the vehicle exceeds the value attainable by the control of the braking/driving forces of the wheels. This situation is not considered in the above-mentioned conventional braking/driving force control apparatus, and it is necessary to make an improvement on this point.

DISCLOSURE OF THE INVENTION

The present invention had been accomplished in view of the circumstance described above in the conventional vehicle braking/driving force control apparatus that is configured to control braking/driving force and yaw moment of the vehicle through the control of the braking/driving forces of the wheels, and the main subject of the present invention is to achieve a braking/driving force and yaw moment, which are required to the vehicle, as much as possible within the ranges of the braking/driving forces that can be generated by the wheels through the control of the braking/driving forces of the wheels such that, when the braking/driving force and/or yaw moment required to the vehicle exceeds a value attainable by the control of the braking/driving forces of the wheels, one of the vehicle braking/driving force and the vehicle yaw moment is made close to the braking/driving force or yaw moment required to the vehicle as much as possible.

The above-mentioned main subject can be achieved by a vehicle braking/driving force control apparatus comprising braking/driving force applying means that can apply braking/driving forces to wheels; means for detecting an amount of driving operation by an occupant; means for calculating a vehicle target braking/driving force and a vehicle target yaw moment, which should be generated by the braking/driving forces of the wheels, on the basis of at least the amount of the driving operation by the occupant; and control means for controlling the braking/driving force applied to each wheel by the braking/driving force applying means such that, when the target braking/driving force and the target yaw moment cannot be achieved by the braking/driving forces of the wheels, target braking/driving force after the modification and target yaw moment after the modification are respectively defined to be the braking/driving force and yaw moment, both of which are within the range of the braking/driving force and yaw moment attainable by the braking/driving forces of the wheels, and the yaw moment of which has a value that is the closest to the target yaw moment, and the vehicle braking/driving force and the yaw moment through the control of the braking/driving forces of the wheels respectively become the target braking/driving force after the modification and the target yaw moment after the modification.

Further, the above-mentioned main subject can also be achieved by a vehicle braking/driving force control apparatus comprising braking/driving force applying means that can apply braking/driving forces to wheels; means for detecting an amount of driving operation by an occupant; means for calculating a vehicle target braking/driving force and a vehicle target yaw moment, which should be generated by the braking/driving forces of the wheels, on the basis of at least the amount of the driving operation by the occupant; and control means for controlling the braking/driving force applied to each wheel by the braking/driving force applying means such that, when the target braking/driving force and the target yaw moment cannot be achieved by the braking/driving forces of the wheels, target braking/driving force after the modification and target yaw moment after the modification are respectively defined to be the braking/driving force and yaw moment, both of which are within the range of the braking/driving force and yaw moment attainable by the braking/driving forces of the wheels, and the braking/driving force of which has a value that is the closest to the target braking/driving force, and the vehicle braking/driving force and the yaw moment through the control of the braking/driving forces of the wheels respectively become the target braking/driving force after the modification and the target yaw moment after the modification.

According to the former configuration, when the target braking/driving force and/or the target yaw moment cannot be achieved by the braking/driving forces of the wheels, the braking/driving force applied to each wheel by the braking/driving force applying means is controlled such that target braking/driving force after the modification and target yaw moment after the modification are respectively defined to be the braking/driving force and yaw moment, both of which are within the range of the braking/driving force and yaw moment attainable by the braking/driving forces of the wheels, and the yaw moment of which has a value that is the closest to the target yaw moment, and the vehicle braking/driving force and the yaw moment through the control of the braking/driving forces of the wheels respectively become the target braking/driving force after the modification and the target yaw moment after the modification. Accordingly, the braking/driving forces of the wheels are controlled so as to achieve the vehicle target yaw moment as much as possible, whereby the yaw moment required to the vehicle can be achieved as much as possible within the ranges of the braking/driving forces that can be generated by the wheels.

According to the latter configuration, when the target braking/driving force and/or the target yaw moment cannot be achieved by the braking/driving forces of the wheels, the braking/driving force applied to each wheel by the braking/driving force applying means is controlled such that target braking/driving force after the modification and target yaw moment after the modification are respectively defined to be the braking/driving force and yaw moment, both of which are within the range of the braking/driving force and yaw moment attainable by the braking/driving forces of the wheels, and the yaw moment of which has a value that is the closest to the target yaw moment, and the vehicle braking/driving force and the yaw moment through the control of the braking/driving forces of the wheels respectively become the target braking/driving force after the modification and the target yaw moment after the modification. Accordingly, the braking/driving forces of the wheels are controlled so as to achieve the vehicle target braking/driving force as much as possible, whereby the braking/driving force required to the vehicle can be achieved as much as possible within the ranges of the braking/driving forces that can be generated by the wheels.

According to one aspect of the present invention, in the aforesaid configuration, it is preferable that, when the magnitude of the target yaw moment exceeds the magnitude of the maximum yaw moment attainable by the braking/driving forces of the wheels, the target yaw moment is modified to the maximum yaw moment.

With this configuration, when the magnitude of the target yaw moment exceeds the magnitude of the maximum yaw moment attainable by the braking/driving forces of the wheels, the target yaw moment is modified to t the maximum yaw moment, whereby the braking/driving forces of the wheels are controlled so as to achieve the vehicle target yaw moment as much as possible According to another aspect of the present invention, in the aforesaid configuration, it is preferable that, when the magnitude of the target yaw moment is not more than the maximum yaw moment attainable by the braking/driving force of the wheels, the control means controls the braking/driving force applied to each wheel by the braking/driving force applying means such that a target point in a rectangular coordinate with the vehicle driving/braking force and the vehicle yaw moment as coordinate axes is defined to be the point of intersection closer to a reference point representing the target braking/driving force and the target yaw moment among points of intersection where a straight line, which passes the reference point and is parallel to the coordinate axis of the yaw moment, crosses a line indicating the maximum values in magnitudes of the vehicle braking/driving force and the yaw moment by the braking/driving forces of the wheels, and the vehicle braking/driving force and the yaw moment by the braking/driving forces of the wheels take the values at the target point.

With this configuration, when the magnitude of the target yaw moment is not more than the maximum yaw moment attainable by the braking/driving forces of the wheels, the control means controls the braking/driving force applied to each wheel by the braking/driving force applying means such that a target point in a rectangular coordinate with the vehicle driving/braking force and the vehicle yaw moment as coordinate axes is defined to be the point of intersection closer to a reference point representing the target braking/driving force and the target yaw moment among points of intersection where a straight line, which passes the reference point and is parallel to the coordinate axis of the yaw moment, crosses a line indicating the maximum values in magnitudes of the vehicle braking/driving force and the yaw moment by the braking/driving forces of the wheels, and the vehicle braking/driving force and the yaw moment by the braking/driving forces of the wheels take the values at the target point. Therefore, the braking/driving forces of the wheels can be controlled such that the vehicle yaw moment surely becomes the target yaw moment and the vehicle braking/driving force is made closer to the target braking/driving force as much as possible.

According to another aspect of the present invention, in the aforesaid configuration, it is preferable that, when the magnitude of the target braking/driving force exceeds the maximum braking/driving force attainable by the braking/driving forces of the wheels, the target braking/driving force is modified to the maximum braking/driving force.

With this configuration, when the magnitude of the target braking/driving force exceeds the maximum braking/driving force attainable by the braking/driving forces of the wheels, the target braking/driving force is modified to the maximum braking/driving force. Therefore, the braking/driving forces of the wheels can be controlled so as to achieve as much as possible the vehicle target braking/driving force.

According to another aspect of the present invention, in the aforesaid configuration, it is preferable that, when the magnitude of the target braking/driving force is not more than the maximum braking/driving force attainable by the braking/driving force of the wheels, the control means controls the braking/driving force applied to each wheel by the braking/driving force applying means such that t a target point in a rectangular coordinate with the vehicle driving/braking force and the vehicle yaw moment as coordinate axes is defined to be the point of intersection closer to a reference point representing the target braking/driving force and the target yaw moment among points of intersection where a straight line, which passes the reference point and is parallel to the coordinate axis of the yaw moment, crosses a line indicating the maximum values in magnitudes of the vehicle braking/driving force and the yaw moment by the braking/driving forces of the wheels, and the vehicle braking/driving force and the yaw moment by the braking/driving forces of the wheels take the values at the target point.

With this configuration, when the magnitude of the target braking/driving force is not more than the maximum braking/driving force attainable by the braking/driving force of the wheels, the control means controls the braking/driving force applied to each wheel by the braking/driving force applying means such that a target point in a rectangular coordinate with the vehicle driving/braking force and the vehicle yaw moment as coordinate axes is defined to be the point of intersection closer to a reference point representing the target braking/driving force and the target yaw moment among points of intersection where a straight line, which passes the reference point and is parallel to the coordinate axis of the yaw moment, crosses a line indicating the maximum values in magnitudes of the vehicle braking/driving force and the yaw moment by the braking/driving forces of the wheels, and the vehicle braking/driving force and the yaw moment by the braking/driving forces of the wheels take the values at the target point. Therefore, the braking/driving forces of the wheels can be controlled such that the vehicle braking/driving force surely becomes the target braking/driving force and the vehicle yaw moment is made closer to the target yaw moment as much as possible.

According to another aspect of the present invention, in the above-mentioned configuration, it is preferable that the control means includes determining means that determines which one of the braking/driving force and yaw moment should take priority on the basis of the running condition of the vehicle, and modifying means that defines the target braking/driving force after the modification and target yaw moment after the modification to be the braking/driving force and yaw moment, both of which are within the range of the braking/driving force and yaw moment attainable by the braking/driving forces of the wheels, and the yaw moment of which has a value that is the closest to the target yaw moment, when it is determined that the yaw moment should take priority, and defines the target braking/driving force after the modification and target yaw moment after the modification to be the braking/driving force and yaw moment, both of which are within the range of the braking/driving force and yaw moment attainable by the braking/driving forces of the wheels, and the braking/driving force of which has a value that is the closest to the target braking/driving force, when it is determined that the braking/driving force should take priority.

With this configuration, it is determined which one of the braking/driving force and yaw moment should take priority on the basis of the running condition of the vehicle, and when it is determined that the yaw moment should take priority, the target braking/driving force after the modification and target yaw moment after the modification are defined to be the braking/driving force and yaw moment, both of which are within the range of the braking/driving force and yaw moment attainable by the braking/driving forces of the wheels, and the yaw moment of which has a value that is the closest to the target yaw moment, while when it is determined that the braking/driving force should take priority, the target braking/driving force after the modification and target yaw moment after the modification are defined to be the braking/driving force and yaw moment, both of which are within the range of the braking/driving force and yaw moment attainable by the braking/driving forces of the wheels, and the braking/driving force of which has a value that is the closest to the target braking/driving force. Therefore, the braking/driving forces of the wheels can be controlled so as to achieve in preference the target braking/driving force or the target yaw moment according to the vehicle running condition.

According to another aspect of the present invention, in the above-mentioned configuration, it is preferable that the means for calculating a vehicle target braking/driving force and a vehicle target yaw moment calculates the vehicle target braking/driving force and the vehicle target total yaw moment for causing the vehicle to stably run on the basis of at least the amount of the driving operation by an occupant, estimates a vehicle turning yaw moment due to a lateral force of each wheel on the basis of at least the amount of the driving operation by the occupant, and calculates the vehicle target yaw moment by subtracting the turning yaw moment from the target total yaw moment.

With this configuration, the vehicle target braking/driving force and the vehicle target total yaw moment for causing the vehicle to stably run is calculated on the basis of at least the amount of the driving operation by the occupant, a vehicle turning yaw moment due to a lateral force of each wheel is estimated on the basis of at least the amount of the driving operation by the occupant, and the vehicle target yaw moment is calculated by subtracting the turning yaw moment from the target total yaw momentas, whereby the vehicle target yaw moment required to the vehicle to be attained by the control of the braking/driving forces of the wheels can be surely and correctly calculated in just proportion.

According to another aspect of the present invention, in the above-mentioned configurations, it is preferable that the braking/driving force applying means independently applies braking/driving force to each wheel.

According to another aspect of the present invention, in the above-mentioned configurations, it is preferable that the braking/driving force applying means applies independently the braking force to each wheel, and applies a driving force from driving means, which is common to right and left wheels, to the right and left wheels in such a manner that the distribution of the driving forces to the right and left wheels is variable.

According to another aspect of the present invention, in the above-mentioned configurations, it is preferable that the means for detecting an amount of driving operation by an occupant detects an amount of acceleration/deceleration operation and an amount of steering operation by an occupant.

According to another aspect of the present invention, in the above-mentioned configurations, it is preferable that the line indicating the greatest values in magnitudes of the vehicle braking/driving force and the vehicle yaw moment is determined by the greatest value of the vehicle driving force, the greatest value of the vehicle braking force, the greatest value of the vehicle yaw moment in the leftward turning direction and the vehicle yaw moment in the rightward turning direction.

According to another aspect of the present invention, in the above-mentioned configurations, it is preferable that the line indicating the greatest values in magnitudes of the vehicle braking/driving force and the vehicle yaw moment is variably set in accordance with a road friction coefficient.

According to another aspect of the present invention, in the above-mentioned configurations, it is preferable that the braking/driving force applying means comprises means for applying driving force to each wheel independently, and means for applying braking force to each wheel independently.

According to another aspect of the present invention, in the above-mentioned configurations, it is preferable that the braking/driving force applying means comprises means for applying common driving force to the right and left wheels, means for controlling the distribution of the driving force to the right and left wheels, and means for applying braking force to each wheel independently.

According to another aspect of the present invention, in the above-mentioned configurations, it is preferable that the means for applying driving force comprises means for applying common driving force to the right and left front wheels, and means for applying common driving force to the right and left rear wheels.

According to another aspect of the present invention, in the above-mentioned configurations, it is preferable that the means for applying driving force comprises means for applying common driving force to the right and left front wheels and the right and left rear wheels, means for controlling the distribution of the driving force to the front and rear wheels, means for controlling the distribution of the driving force to the right and left front wheels, and means for controlling the distribution of the driving force to the right and left rear wheels.

According to another aspect of the present invention, in the above-mentioned configurations, it is preferable that the means for applying driving force comprises an electric motor generator.

According to another aspect of the present invention, in the above-mentioned configurations, it is preferable that the electric motor generator performs regenerative braking upon the braking.

According to another aspect of the present invention, in the aforesaid configurations, when the magnitude of the target yaw moment is not more than the maximum yaw moment attainable by the braking/driving forces of the wheels, it is preferable that the target yaw moment after the modification is set to the value equal to the target yaw moment before the modification.

According to another aspect of the present invention, in the aforesaid configurations, when the magnitude of the target braking/driving force is not more than the maximum braking/ driving force attainable by the braking/driving forces of the wheels, it is preferable that the target braking/driving force after the modification is set to the value equal to the target braking/driving force before the modification.

According to another aspect of the present invention, in the aforesaid configurations, it is preferable that the determining means determines which one of the braking/driving force and yaw moment should take priority on the basis of the target braking/driving force and the target yaw moment before the modification.

According to another aspect of the present invention, in the aforesaid configurations, it is preferable that, when the magnitude of the target yaw moment before the modification exceeds the magnitude of the maximum yaw moment attainable by the braking/driving forces of the wheels, the determining means determines that the yaw moment should take priority.

According to another aspect of the present invention, in the aforesaid configurations, it is preferable that, when the magnitude of the target braking/driving force before the modification exceeds the magnitude of the maximum braking/driving force attainable by the braking/driving forces of the wheels, the determining means determines that the braking/driving force should take priority.

According to another aspect of the present invention, in the aforesaid configurations, it is preferable that, when the magnitude of the target braking/driving force before the modification is not less than the determining reference value under the condition where the magnitude of the target yaw moment before the modification is not more than the maximum yaw moment attainable by the braking/driving forces of the wheels, the determining means determines that the yaw moment should take priority.

According to another aspect of the present invention, in the above-mentioned configurations, it is preferable that the means for calculating the vehicle target braking/driving force and the vehicle target yaw moment calculates a vehicle target longitudinal acceleration and a vehicle target yaw rate for stably running the vehicle on the basis of at least the amount of the driving operation by an occupant, and calculates the vehicle target driving/braking force and the vehicle target total yaw moment on the basis of the vehicle target longitudinal acceleration and the vehicle target yaw rate.

According to another aspect of the present invention, in the above-mentioned configurations, it is preferable that the control means calculates the target braking/driving force of each wheel on the basis of the vehicle target braking/driving force, the vehicle target yaw moment, and the distribution ratio of the braking/driving force to the front and rear wheels, and controls the braking/driving force applied to each wheel on the basis of the target braking/driving force of each wheel.

BEST MODE FOR CARRYING OUT THE INVENTION

Some preferred embodiments of the present invention will be explained in detail with reference to the accompanying drawings.

First Embodiment

Figure 1:
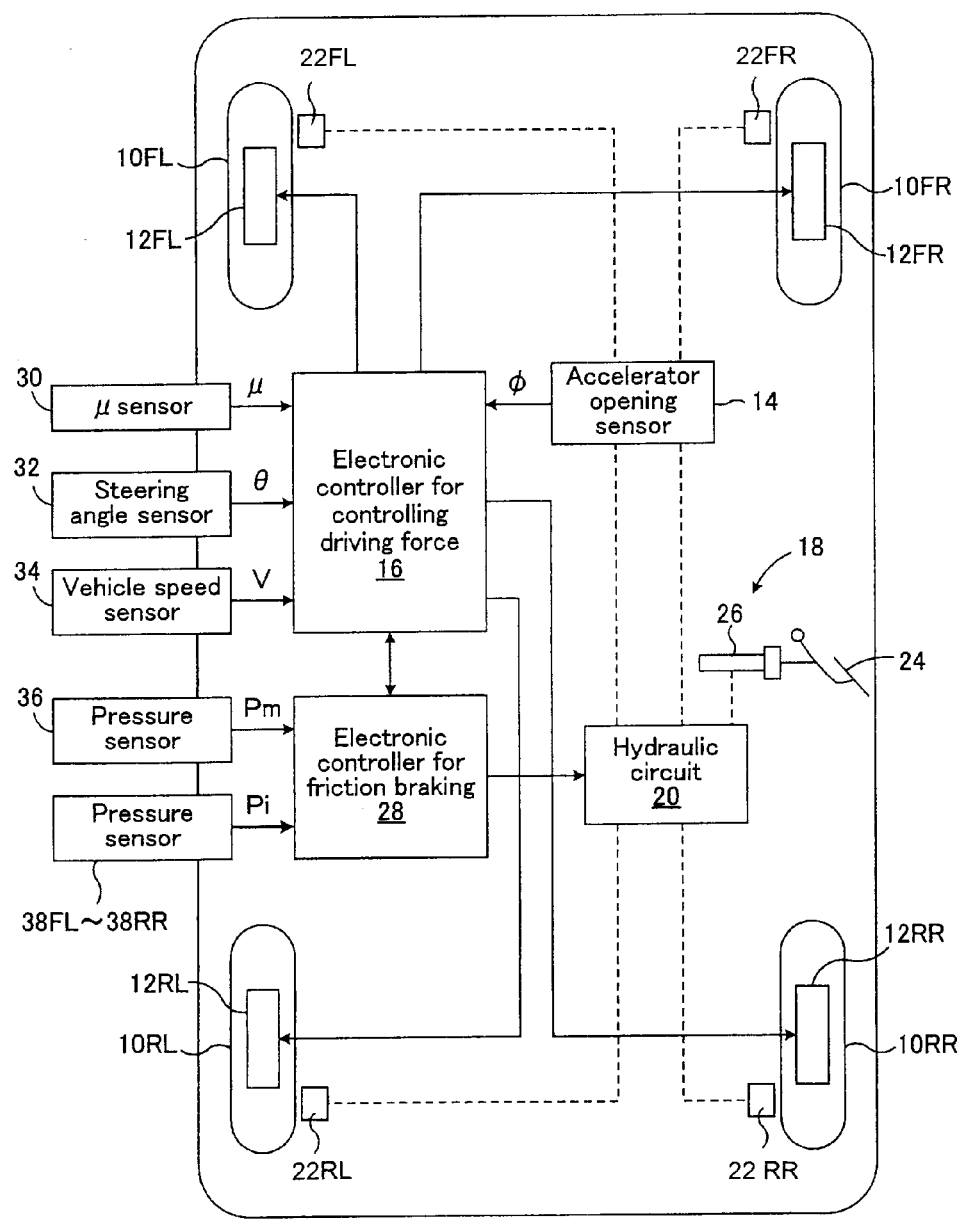
FIG. 1 is a schematic block diagram showing a braking/driving force control apparatus applied to a four-wheel-drive vehicle of a wheel-in-motor type according to a first embodiment of the present invention.

FIG. 1 is a schematic block diagram showing a braking/driving force control apparatus applied to a four-wheel-drive vehicle of a wheel-in-motor type according to a first embodiment of the present invention.

In FIG. 1, numerals 10FL and 10FR respectively represent left and right front wheels that are steering wheels, and numerals 10RL and 10RR respectively represent left and right rear wheels that are non-steering wheels. Electric motor generators 12FL and 12FR that are in-wheel motors are incorporated into the left and right front wheels 10FL and 10FR respectively, whereby the left and right front wheels 10FL and 10FR are driven by the electric motor generators 12FL and 12FR. The electric motor generators 12FL and 12FR also function as regenerative electric generators for each of the left and right front wheels upon the braking, so that they generate regenerative braking force.

Similarly, electric motor generators 12RL and 12RR that are in-wheel motors are incorporated into the left and right rear wheels 10RL and 10RR respectively, whereby the left and right front wheels 10RL and 10RR are driven by the electric motor generators 12RL and 12RR. The electric motor generators 12RL and 12RR also function as regenerative electric generators for each of the left and right rear wheels upon the braking, so that they generate regenerative braking force.

The driving force from each of the electric motor generators 12FL to 12RR is controlled by an electronic controller 16 for controlling driving force on the basis of an accelerator opening (that is a step-on amount of an accelerator pedal, that is not shown in FIG. 1, detected by an accelerator opening sensor 14. The regenerative braking force from each of the electric motor generators 12FL to 12RR is also controlled by the electronic controller 16 for controlling driving force.

Although not shown in FIG. 1 in detail, the electronic controller 16 for controlling driving force is composed of a microcomputer and a driving circuit, wherein the microcomputer may have a general configuration to include, for example, a CPU, ROM, RAM, and input/output port device, those of which are interconnected with one another via a bi-directional common bus. In a normal running, electric power charged in a battery, which is not shown in FIG. 1, is supplied to each of the electric motor generators 12FL to 12RR, and upon the deceleration and braking of the vehicle, the electric power generated by the regenerative braking by each of the electric motor generators 12FL to 12RR is charged to the battery via the driving circuit.

The friction braking forces of the left and right front wheels 10FL and 10FR and the left and right rear wheels 10RL and 10RR are controlled by controlling braking pressures of corresponding wheel cylinders 22FL, 22FR, 22RL and 22RR by a hydraulic circuit 20 in a friction braking device 18. Although not shown in the figure, the hydraulic circuit 20 includes a reservoir, oil pump, and other various valve devices. In a normal situation, the braking pressure of each wheel cylinder is controlled in accordance with the step-on amount of the brake pedal 24 by a driver and the pressure of a master cylinder 26 that is driven in accordance with the step-on operation of the brake pedal 24. It is controlled as necessary through the control of the oil pump or various valve devices by an electronic controller 28 for controlling braking force, regardless of the step-on amount of the brake pedal 24 by a driver.

Although not shown in FIG. 1 in detail, the electronic controller 18 for controlling braking force is also composed of a microcomputer and a driving circuit, wherein the microcomputer may have a general configuration to include, for example, a CPU, ROM, RAM, and input/output port device, those of which are interconnected with one another via a bi-directional common bus.

Inputted to the electronic controller 16 for controlling driving force are a signal indicating a road friction coefficient $\mu$ from a $\mu$ sensor 30; a signal indicating a steering angle $\theta$ from a steering angle sensor 32; and a signal indicating a vehicle speed V from a vehicle speed sensor 34, in addition to the signal indicating the accelerator opening $\phi$ from the accelerator opening sensor 14. Inputted to the electronic controller 28 for controlling braking force are a signal indicating a master cylinder pressure Pm from a pressure sensor 36 and signals indicating braking pressures (wheel cylinder pressures) Pbi (i=fl, fr, rl, rr) of corresponding wheels from pressure sensors 38FL to 38RR. The electronic controller 16 for controlling driving force and the electronic controller 28 for controlling braking force exchange signals with each other according to need. Note that the steering angle sensor 32 detects a steering angle $\theta$ with the leftward turning direction of the vehicle defined as a positive.

The electronic controller 16 for controlling driving force calculates a vehicle target longitudinal acceleration Gxt on the basis of the accelerator opening $\phi$ and the master cylinder pressure Pm, which indicate an amount of acceleration/deceleration operation by a driver, and calculates a target yaw rate $\gamma t$ of the vehicle on the basis of the steering angle $\theta$, which is an amount of steering operation by a driver, and the vehicle speed V through a manner well-known in this technical field. Then, the electronic controller 16 for controlling driving force calculates a target braking/driving force Fvn that is required to the vehicle on the basis of the vehicle target longitudinal acceleration Gxt, and calculates a target total yaw moment Mvnt required to the vehicle on the basis of the vehicle target yaw rate $\gamma t$.

The electronic controller 16 for controlling driving force calculates the vehicle slip angle $\beta$ with a manner well-known in this technical field, calculates the slip angle $\alpha$ of the left and right front wheels on the basis of the vehicle slip angle $\beta$ and the steering angle $\theta$, and calculates a vehicle turning yaw moment Ms due to a lateral force of each wheel on the basis of the slip angle $\alpha$. Then, the electronic controller 16 for controlling driving force calculates the value obtained by subtracting the turning yaw moment Ms from the vehicle target total yaw moment Mvnt as the vehicle target yaw moment Mvn, required to the vehicle, through the control of the braking/driving force of each wheel.

The electronic controller 16 for controlling driving force further calculates the vehicle maximum driving force Fvdmax and the vehicle maximum braking force Fvbmax attainable by the braking/driving forces of the wheels on the basis of the road friction coefficient µ, and calculates the vehicle maximum yaw moment Mvlmax in the leftward turning direction and the vehicle maximum yaw moment Mvrmax in the rightward turning direction attainable by the braking/driving forces of the wheels on the basis of the road friction coefficient µ.

Figure 2A:
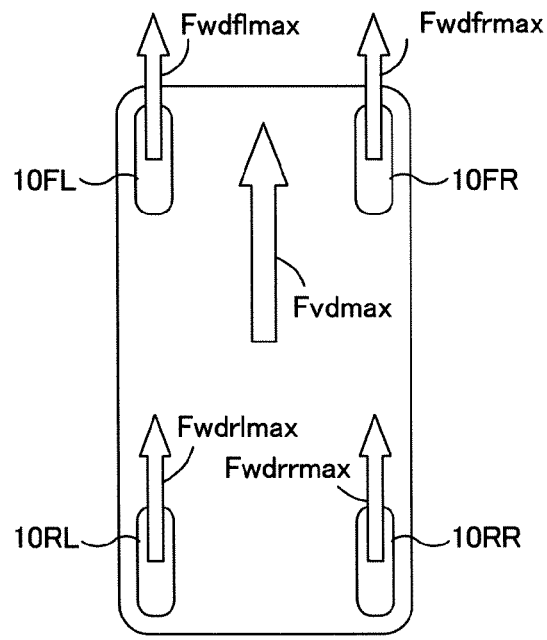
FIG. 2 is an explanatory view for explaining various cases of the relationship between braking/driving force of each wheel and vehicle braking/driving force and the relationship between braking/driving force of each wheel and yaw moment.
Figure 2B:
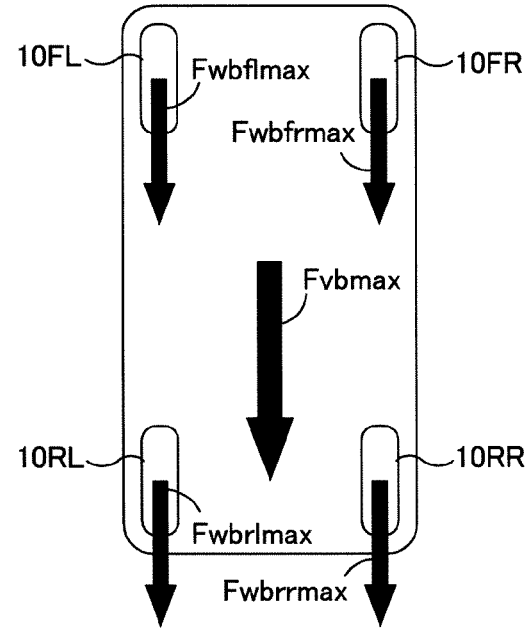

As shown in FIG. 2A, supposing that the vertical load and the friction coefficients to the road surface of the wheels are the same, and the sizes of the friction circles of the wheels are the same, the vehicle maximum driving force Fvdmax under the condition where the yaw moment by the braking/driving forces of the wheels is not acted on the vehicle is achieved when the braking/driving forces Fwxfl and Fwxfr of the left and right front wheels 10FL and 10FR are the maximum driving forces Fwdflmax and Fwdfrmax and the braking/driving forces Fwxrl and Fwxrr of the left and right rear wheels 10RL and 10RR are the maximum driving forces Fwdrlmax and Fwdrrmax. Similarly, as shown in FIG. 2B, the vehicle maximum braking force Fvbmax under the condition where the yaw moment by the braking/driving forces of the wheels is not acted on the vehicle is achieved when the braking/driving forces Fwxfl and Fwxfr of the left and right front wheels 10FL and 10FR are the maximum braking forces Fwbflmax and Fwbfrmax and the braking/driving forces Fwxrl and Fwxrr of the left and right rear wheels 10RL and 10RR are the maximum braking forces Fwbrlmax and Fwbrrmax.

Figure 2C:
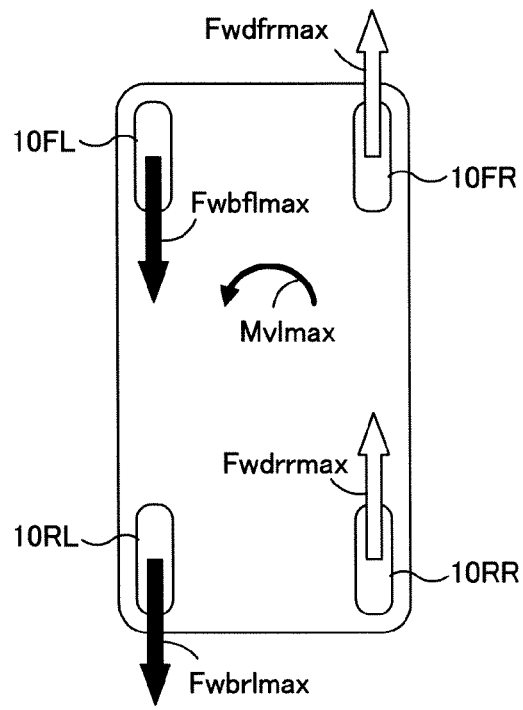
Figure 2D:
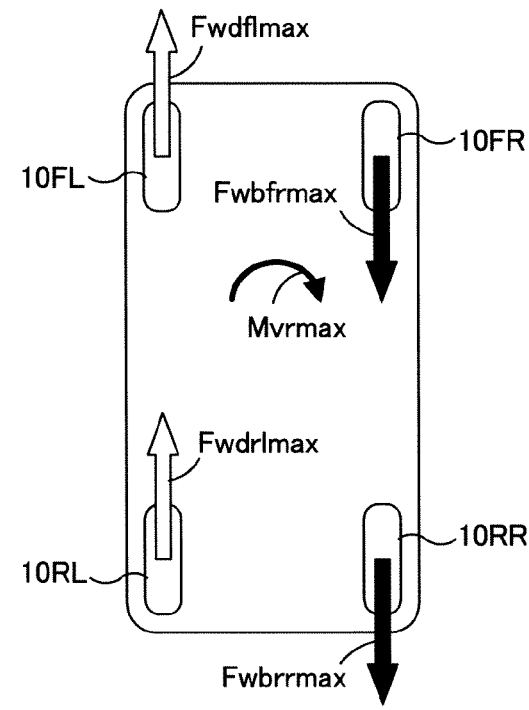

As shown in FIG. 2C, the vehicle maximum yaw moment Mvlmax in the leftward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum braking forces Fwbflmax and Fwbrlmax and the braking/driving forces Fwxfr and Fwxrr of the front right and rear right wheels 10FR and 10RR are the maximum driving forces Fwdfrmax and Fwdrrmax. Similarly, as shown in FIG. 2D, the vehicle maximum yaw moment Mvrmax in the rightward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum driving forces Fwdflmax and Fwdrlmax and the braking/driving forces Fwxfr and Fwxrr of the front right and rear right wheels 10FR and 10RR are the maximum braking forces Fwbfrmax and Fwbrrmax.

In case where the output torque of each of the electric motor generators 12FL to 12RR is sufficiently great, the maximum driving force and the maximum braking force of each wheel are determined by the road friction coefficient µ, so that, with the vehicle accelerating direction and vehicle leftward turning direction defined as positive, the following relationships are established between the maximum driving force and the maximum braking force of each wheel, the vehicle maximum driving force and the vehicle maximum braking force, and the vehicle maximum yaw moment in the leftward turning direction and the vehicle maximum yaw moment in the rightward turning direction.

Fwdflmax=Fwdformax=−Fwbflmax=−Fwbfrmax
Fwdrlmax=Fwdrrmax=−Fwbrlmax=−Fwbrrmax
Fvdmax=−Fvbmax
Mvlmax=−Mvrmax Since the maximum driving force Fwdimax and the maximum braking force Fwbimax (i=fl, fr, rl, rr) of each wheel are determined by the road friction coefficient µ, the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction are also determined by the road friction coefficient µ. Accordingly, if the road friction coefficient µ is found, the vehicle maximum driving force Fvdmax and the other aforesaid values can be estimated.

Figure 4A:
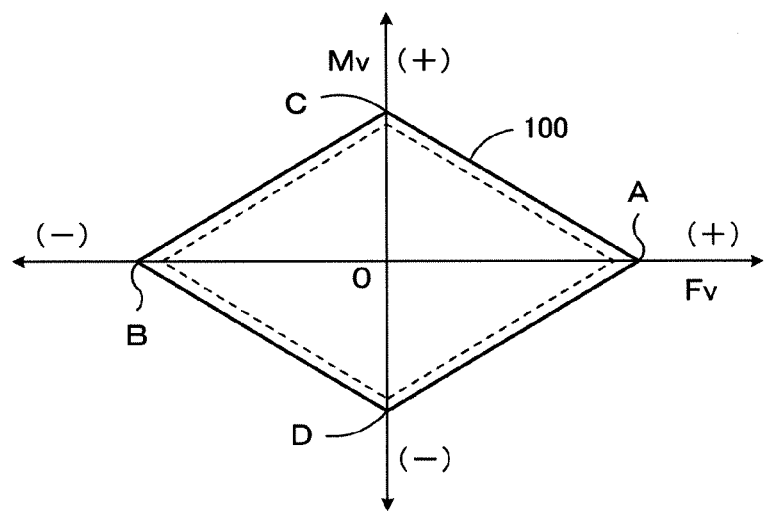
FIG. 4A is a graph showing the range, that can be achieved by the braking/driving force of each wheel, of the vehicle braking/driving force and vehicle yaw moment.

As shown in FIG. 4A, in a rectangular coordinate with the vehicle braking/driving force Fvx as abscissa and the vehicle yaw moment Mv as ordinate, the vehicle braking/driving force Fvx and the vehicle yaw moment Mv that can be achieved by the control of the braking/driving force of each wheel take values within a diamond quadrangle 100 decided by the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction.

Notably, in FIG. 4, points A to D correspond to the cases A to D in FIG. 2, wherein the coordinates at the points A to D are (Fvdmax, 0), (Fvbmax, 0), (0, Mvlmax), and (0, Mvrmax), respectively. As shown by a broken line in FIG. 4A, the quadrangle 100 becomes small as the road friction coefficient µ decreases. Further, as the steering angle θ increases, the lateral force of front left and front right wheels, that are steering wheels, increases, so that the allowance of the longitudinal force becomes small. Therefore, the quadrangle 100 becomes small as the magnitude of the steering angle θ increases.

Supposing that the longitudinal distribution ratio of the vehicle braking/driving force Fv to the rear wheels is defined as Kr (constant of 0<Kr<1), and the vehicle tread is defined as Tr, the following equations 1 to 3 are established. Accordingly, the electronic controller 16 for controlling driving force sets the vehicle target braking/driving force Fvt and the vehicle target yaw moment Mvt by the control of the braking/driving forces of each wheel to the target braking/driving force Fvn and the vehicle target yaw moment Mvn, when the vehicle target braking/driving force Fvn and the vehicle target yaw moment Mvn are within the above-mentioned quadrangle 100. For example, it calculates the values satisfying the following equations 1 to 3 as the target braking/driving forces Fwxti (i=fl, fr, rl, rr) of the wheels by the least square method.

$$Fwxfl+Fwxfr+Fwxrl+Fwxrr=Fvt \quad (1)$$

$$\{Fwxfr+Fwxrr-(Fwxfl+Fwxrl)\}Tr/2=Mvt \quad (2)$$

$$(Fwxfl+Fwxfr)Kr=(Fwxrl+Fwxrr)(1-Kr) \quad (3)$$

When the vehicle target braking/driving force Fvn and the vehicle target yaw moment Mvn are outside the range of the above-mentioned quadrangle 100, the electronic controller 16 for controlling driving force determines which one of the braking/driving force and the yaw moment should take priority on the basis of the target braking/driving force Fvn and the target yaw moment Mvn by the braking/driving forces of the wheels. When determining that the yaw moment should take priority, the electronic controller 16 for controlling driving force calculates the vehicle target braking/driving force Fvt and the vehicle target yaw moment Mvt after the modification so as to attain the target yaw moment Mvn as much as possible, while when determining that the braking/driving force should take priority, it calculates the vehicle target braking/driving force Fvt and the vehicle target yaw moment Mvt after the modification so as to attain the target braking/ driving force Fvn as much as possible. Then, the electronic controller 16 for controlling driving force calculates the values satisfying the foregoing equations 1 to 3 as the target braking/driving forces Fwxti of the wheels by the least square method, for example.

When the target braking/driving force Fwxti of each wheel takes a positive value that means it is a driving force, the electronic controller 16 for controlling driving force sets the target friction braking force Fwbti and the target regenerative braking force Fwrti (i=fl, fr, rl, rr) of each wheel to zero, outputs the signals indicating the target friction braking forces Fwbti to the electronic controller 28 for controlling braking force, sets the target driving force Fwdti (i=fl, fr, rl, rr) of each wheel to the associated target braking/driving force Fwxti, calculates the target driving currents Iti (i=fl, fr, rl, rr) to the electric motor generators 12FL to 12RR by unillustrated maps or functions on the basis of the target driving forces Fwdti, and controls the driving currents applied to the electric motor generators 12FL to 12RR on the basis of the target driving currents Iti, thereby controlling the driving force of each wheel such that the braking/driving force Fwxi of each wheel becomes the associated target braking/driving force Fwxti.

On the other hand, when the target braking/driving forces Fwxti of each wheel takes a negative value which means that the target braking/driving force Fwxti is a braking force and the target braking/driving force Fwxti is not more than the maximum regenerative braking force of each wheel, the electronic controller 16 for controlling driving force sets the target driving force Fwdti and the target friction braking force Fwbti of each wheel to zero, sets the target regenerative braking force Fwrti to the target braking/driving force Fwxti, and controls the electric motor generators 12FL to 12RR such that the regenerative braking force becomes the target regenerative braking force Fwrti.

When the target braking/driving force Fwxti of each wheel takes a negative value which means that the target braking/driving force Fwxti is a braking force and the target braking/driving force Fwxti is greater than the maximum regenerative braking force of each wheel, the electronic controller 16 for controlling driving force sets the target driving force Fwdti of each wheel to zero, sets the target regenerative braking force Fwrti of each wheel to the maximum regenerative braking force Fwxrimax (i=fl, fr, rl, rr), and controls the electric motor generators 12FL to 12RR such that the regenerative braking force becomes the maximum regenerative braking force Fwxrimax. Further, it calculates the braking force that corresponds to the difference between the target braking/driving force Fwxti and the maximum regenerative braking force Fwxrimax as the target friction braking force Fwbti (i=fl, fr, rl, rr), and outputs the signals indicating the target friction braking forces Fwbti of the wheels to the electronic controller 28 for controlling braking force.

The electronic controller 28 for controlling braking force calculates the target braking pressure Pbti (i=fl, fr, rl, rr) of each wheel on the basis of the target friction braking force Fwbti of each wheel inputted from the electronic controller 16 for controlling driving force, and controls the hydraulic circuit 20 such that the braking pressure Pbi of each wheel becomes the associated target braking pressure Pbti, and the friction braking force Fwbi (i=fl, fr, rl, rr) of each wheel thereby becomes the associated target friction braking force Fwbti of each wheel.

Figure 3:
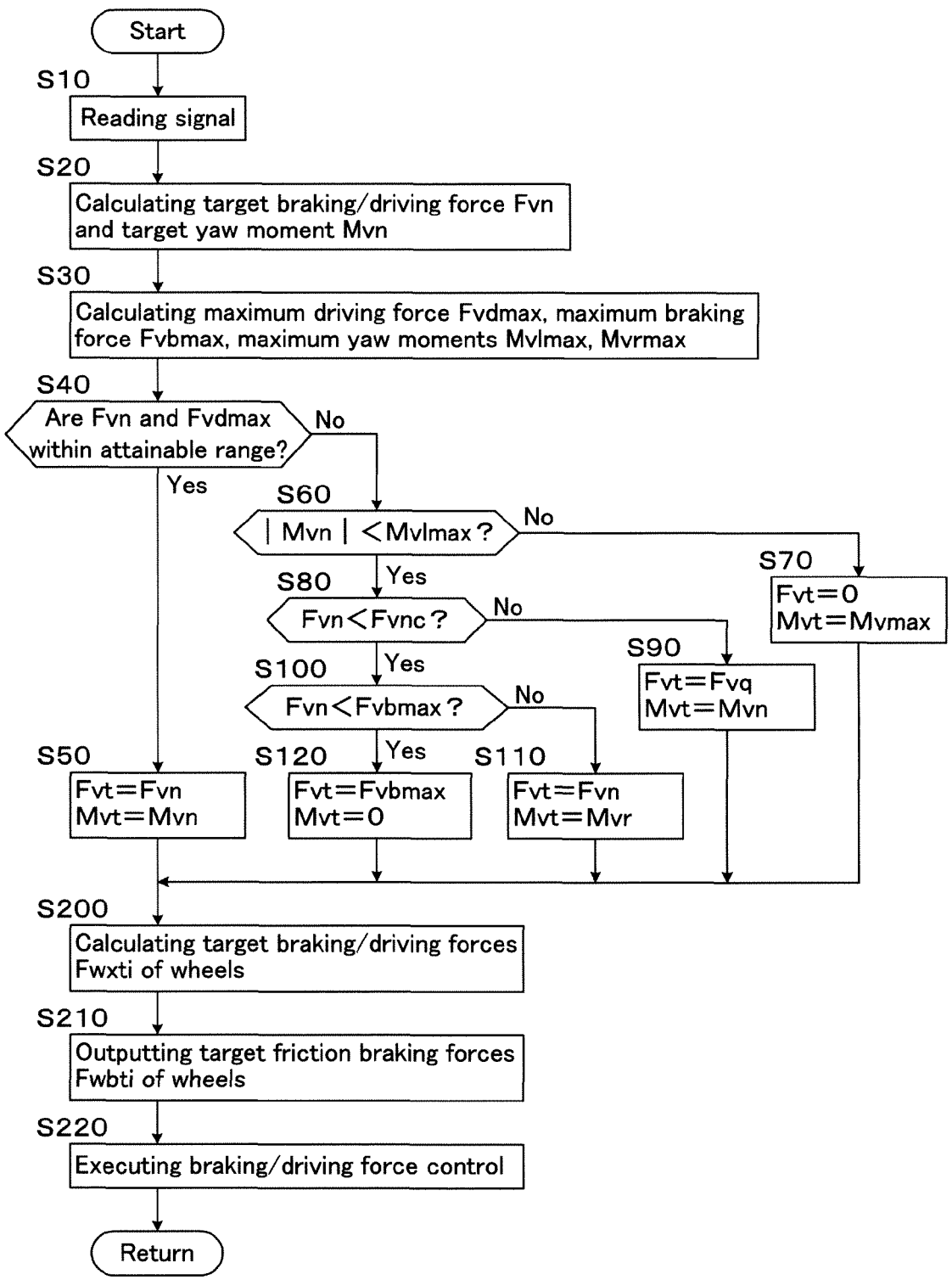
FIG. 3 is a flowchart showing a braking/driving force control routine executed by an electronic controller for controlling driving force in the first embodiment.

The braking/driving force control achieved by the electronic controller 16 for controlling driving force in the first embodiment will now be explained with reference to the flowchart shown in FIG. 3. The control by the flowchart shown in FIG. 3 is started by the activation of the electronic controller 16 for controlling driving force, and it is repeatedly executed every predetermined time until an ignition switch, not shown, is turned off.

At Step 10, the signals indicating the accelerator opening $\phi$ detected by the accelerator opening sensor 14 and the like are firstly read. At Step 20, the vehicle target braking/driving force Fvn and vehicle target yaw moment Mvn that are required to the vehicle and caused by the control of the braking/driving force of each wheel are calculated in the aforesaid manner on the basis of the accelerator opening $\phi$ and the like.

At Step 30, the vehicle maximum driving force Fvdmax, vehicle maximum braking force Fvbmax, vehicle maximum yaw moment Mvlmax in the leftward turning direction, and vehicle maximum yaw moment Mvrmax in the rightward direction, attainable by the braking/driving force of each wheel, are calculated by maps or functions, not shown, on the basis of the road friction coefficient $\mu$. Specifically, the points A to D shown in FIG. 4 are specified.

At Step 40, it is determined whether or not the absolute value of the target braking/driving force Fvn is not more than the vehicle maximum driving force Fvdmax and the absolute value of the vehicle target yaw moment Mvn is not more than the vehicle maximum yaw moment Mvlmax, i.e., it is determined whether the vehicle target braking/driving force Fvn and the vehicle target yaw moment Mvn are within the range of the quadrangular 100 or not and the target braking/driving force Fvn and the target yaw moment Mvn can be achieved or not through the control of the braking/driving force of each wheel. When the negative determination is made, the program proceeds to Step 60. When the positive determination is made, the vehicle target braking/driving force Fvt and the vehicle target yaw moment Mvt after the modification are respectively set to the target braking/driving force Fvn and the target yaw moment Mvn at Step 50, and then, the program proceeds to Step 200.

At Step 60, it is determined whether or not the absolute value of the target yaw moment Mvn is smaller than the vehicle maximum yaw moment Mvlmax. When a positive determination is made, the program proceeds to Step 80. When a negative determination is made, the vehicle target braking/driving force Fvt after the modification is set to zero and the vehicle target yaw moment Mvt after the modification is set to the maximum yaw moment Mvmax (general term of the vehicle maximum yaw moments Mvlmax and Mvrmax) at Step 70, and then, the program proceeds to Step 200. In this case, the vehicle target yaw moment Mvt after the modification is set to the maximum yaw moment Mvlmax when the target yaw moment Mvn takes a positive value, while set to the maximum yaw moment Mvrmax when the target yaw moment Mvn takes a negative value.

At Step 80, it is determined whether or not the target braking/driving force Fvn is smaller than a reference value Fvnc (a negative constant greater than Fvbmax). When a positive determination is made, the program proceeds to Step 100. When a negative determination is made, the program proceeds to Step 90.

Figure 4B:
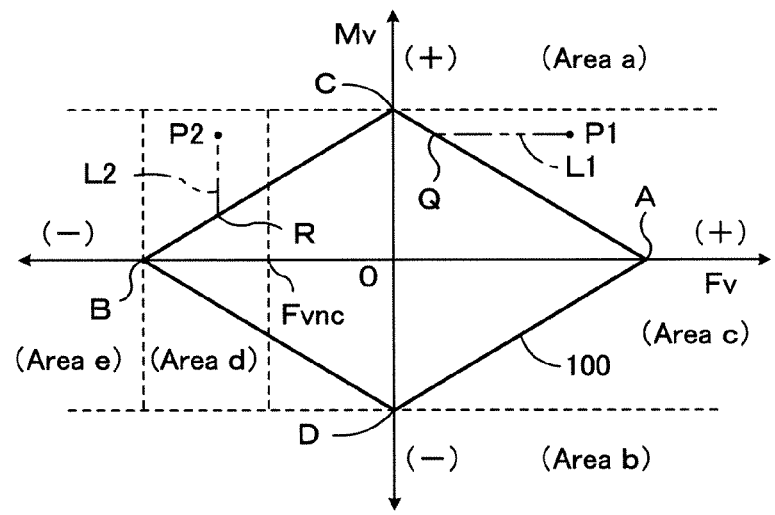
FIG. 4B is an explanatory view showing a manner of a calculation of a vehicle target braking/driving force Fvt and a vehicle target yaw moment Mvt in case where a vehicle target braking/driving force Fvn and a vehicle target yaw moment Mvn are outside the range that can be achieved by the control of the braking/driving force of each wheel in the first embodiment.
Figure 4C:
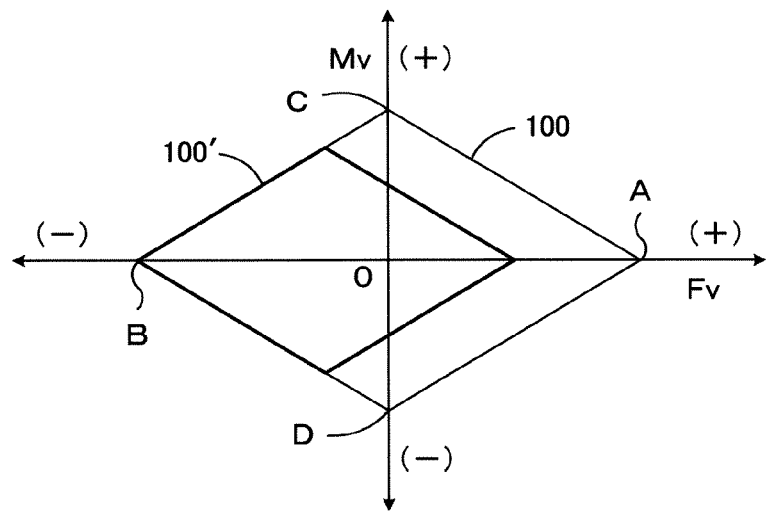
FIG. 4C is an explanatory view showing the range, that can be achieved by the control of the braking/driving force of each wheel, of the vehicle target braking/driving force Fvt and the vehicle target yaw moment Mvt in the vehicle having a driving source provided only at the right and left front wheels or at the right and left rear wheels in the first embodiment.

At Step 90, a point Q, which is closer to a point P1, of the points of intersection of a line L1, which passes the point P1 indicating the vehicle target braking/driving force Fvn and the vehicle target yaw moment Mvn and parallel to the axis of abscissa, and the outer line of the quadrangular 100 is obtained as the target point, as shown in FIG. 4B, and if the coordinate of the target point Q is defined as (Fvq, Mvq), the vehicle target braking/driving force Fvt after the modification and the vehicle target yaw moment Mvt after the modification are set to Fvq and Mvn, respectively. Thereafter, the program proceeds to Step 200.

At Step 100, it is determined whether or not the vehicle target braking/driving force Fvn is takes a valuesmaller than the vehicle maximum braking force Fvbmax (the value greater than the maximum braking force Fvbmax in magnitude). When a negative determination is made, the program proceeds to Step 110. When a positive determination is made, the program proceeds to Step 120.

At Step 110, a point R, which is closer to a point P2, of the points of intersection of a line L2, which passes the point P2 indicating the vehicle target braking/driving force Fvn and the vehicle target yaw moment Mvn and parallel to the axis of ordinate, and the outer line of the quadrangular 100 is obtained as the target point, as shown in FIG. 4B, and if the coordinate of the target point R is defined as (Fvr, Mvr), the vehicle target braking/driving force Fvt after the modification is set to the target braking/driving force Fvn and the vehicle target yaw moment Mvt after the modification is set to Mvr. Thereafter, the program proceeds to Step 200.

At Step 120, the vehicle target braking/driving force Fvt after the modification is set to the maximum braking force Fvbmax, and the vehicle target yaw moment Mvt after the modification is set to zero. Thereafter, the program proceeds to Step 200.

At Step 200, the target braking/driving force Fwxti (i=fl, fr, rl, rr) of each wheel to achieve the target braking/driving force Fvt and the target yaw moment Mvt is calculated in the above-mentioned manner on the basis of the vehicle target braking/driving force Fvt after the modification and the vehicle target yaw moment Mvt after the modification.

At Step 210, the target friction braking force Fwbti is calculated in the aforesaid manner, and the signals indicating the target friction braking forces Fwbti are outputted to the electronic controller 28 for controlling braking force, whereby the electronic controller 28 for controlling braking force makes a control such that the friction braking force Fwbi of each wheel becomes the associated target friction braking force Fwbti.

At Step 220, each of the electric motor generators 12FL to 12RR is controlled such that the driving force Fwdi or the regenerative braking force Fwri of each wheel respectively becomes the target driving force Fwdti or the target regenerative braking force Fwrti.

According to the illustrated first embodiment, the vehicle target braking/driving force Fvn and the vehicle target yaw moment Mvn, required to the vehicle, through the control of the braking/driving forces of the wheels are calculated at Step 20, the vehicle maximum driving force Fvdmax, vehicle maximum braking force Fvbmax, vehicle maximum yaw moment Mvlmax in the leftward turning direction, and the vehicle maximum yaw moment Mvrmax in the rightward turning direction, those of which are attainable by the braking/driving forces of the wheels, are calculated at Step 30, and it is determined at Step 40 whether or not the target braking/driving force Fvn and the target yaw moment Mvn can be achieved through the control of the braking/driving forces of the wheels.

When it is determined at Step 40 that the target braking/driving force Fvn and the target yaw moment Mvn cannot be attained through the control of the braking/driving forces of the wheels, Steps 60 to 120 are executed. When the absolute value of the target yaw moment Mvn is not less than the vehicle maximum yaw moment Mvlmax, the negative determination is made at Step 60, whereby it is determined that the yaw moment should take priority. At Step 70, the vehicle target braking/driving force Fvt after the modification is set to zero, and the vehicle target yaw moment Mvt after the modification is set to the maximum yaw moment Mvmax.

When the absolute value of the target yaw moment Mvn is less than the vehicle maximum yaw moment Mvlmax, the positive determination is made at Step 60. When the target braking/driving force Fvn is not less than the reference value Fvnc, the negative determination is made at Step 80, whereby it is determined that the yaw moment should take priority. At Step 90, the vehicle target braking/driving force Fvt after the modification and the vehicle target yaw moment Mvt after the modification are set to Fvq and Mvn, respectively.

When the absolute value of the target yaw moment Mvn is less than the vehicle maximum yaw moment Mvlmax and the target braking/driving force Fvn is less than the reference value Fvnc, the positive determination is made at Step 80, whereby it is determined that the braking/driving force should take priority. When the vehicle target braking/driving force Fvn is not less than the vehicle maximum braking force Fvbmax, in particular, the negative determination is made at Step 100, whereby the vehicle target braking/driving force Fvt after the modification is set to the target braking/driving force Fvn and the vehicle target yaw moment Mvt after the modification is set to Mvr at Step 110. When the vehicle target braking/driving force Fvn is smaller than the vehicle maximum braking force Fvbmax, the positive determination is made at Step 100, whereby the vehicle target braking/driving force Fvt after the modification is set to the maximum braking force Fvbmax and the vehicle target yaw moment Mvt after the modification is set to zero at Step 120.

The setting of the vehicle target braking/driving force Fvt after the modification and the vehicle target yaw moment Mvt after the modification on the basis of the target braking/driving force Fvn and the target yaw moment Mvn are now considered with reference to FIG. 4B. When the target braking/driving force Fvt and the target yaw moment Mvn are in an area a or area b, the vehicle target braking/driving force Fvt after the modification and the vehicle target yaw moment Mvt after the modification are set to zero and the maximum yaw moment Mvmax, respectively. When the target braking/driving force Fvn and the target yaw moment Mvn are in an area c, the vehicle target braking/driving force Fvt after the modification and the vehicle target yaw moment Mvt after the modification are set to Fvq and the target yaw moment Mvn, respectively. When the target braking/driving force Fvn and the target yaw moment Mvn are in an area d, the vehicle target braking/driving force Fvt after the modification and the vehicle target yaw moment Mvt after the modification are set to the target braking/driving force Fvn and Mvr, respectively. When the target braking/driving force Fvn and the target yaw moment Mvn are in an area e, the vehicle target braking/driving force Fvt after the modification and the vehicle target yaw moment Mvt after the modification are set to the maximum braking force Fvbmax and zero, respectively.

It is to be noted that the areas a and b are those where the magnitude of the yaw moment required to the vehicle is greater, and the area c is the one where the magnitude of the braking force required to the vehicle is not so greater. Therefore, they are the areas where the yaw moment preferably takes priority. On the other hand, the areas d and e are those where the magnitude of the braking force required to the vehicle is greater. Therefore, they are the areas where the braking/driving force preferably takes priority.

Consequently, according to the illustrated first embodiment, when the vehicle is under the condition where the target braking/driving force Fvn and the target yaw moment Mvn cannot be achieved by the control of the braking/driving forces of the wheels, it is determined which one of the braking/driving force and the yaw moment should take priority on the basis of the target braking/driving force Fvn and the target yaw moment Mvn by the braking/driving forces of the wheels required to the vehicle. When it is determined that the yaw moment should take priority, the vehicle target braking/driving force Fvt after the modification and the vehicle target yaw moment Mvt after the modification are calculated so as to attain the target yaw moment Mvn as much as possible. When it is determined that the braking/driving force should take priority, the vehicle target braking/driving force Fvt after the modification and the vehicle target yaw moment Mvt after the modification are calculated so as to attain the target braking/driving force Fvn as much as possible. Accordingly, the braking/driving force and the yaw moment required to the vehicle can be achieved as much as possible within the ranges of the braking/driving forces that can be generated by the wheels, while satisfying as much as possible a request of turning a vehicle when the request is higher, and satisfying as much as possible a request of accelerating and decelerating the vehicle when the request is higher.

In particular, in the illustrated first embodiment, the driving sources for the wheels are electric motor generators 12FL to 12RR provided on each wheel. In case where the target braking/driving forces Fwxti of the wheels take negative values, which means the target braking/driving forces Fwxti are braking forces, the regenerative braking forces by the electric motor generators 12FL to 12RR are used. Accordingly, the vehicle motion energy can effectively be returned as electric energy upon the braking operation for deceleration, while achieving the braking/driving force and the yaw moment required to the vehicle as much as possible within the range of the braking/driving forces that can be generated by the wheels.

While, in the illustrated first embodiment, the electric motor generators 12FL to 12RR are in-wheel motors, the electric motor generators may be provided at the vehicle body. Further, the electric motor generators as driving sources for wheels may not perform regenerative braking. The driving source may be other than the electric motor generator so long as it can increase or decrease the driving force of each wheel independently.

Although the electric motor generators 12FL to 12RR are provided so as to correspond to four wheels in the illustrated first embodiment, this embodiment may be applied to a vehicle having driving sources provided only at the left and right front wheels or left and right rear wheels. In this case, the quadrangle 100 takes a form shown by 100' in FIG. 4C, and when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved with this vehicle.

Second Embodiment

Figure 5:
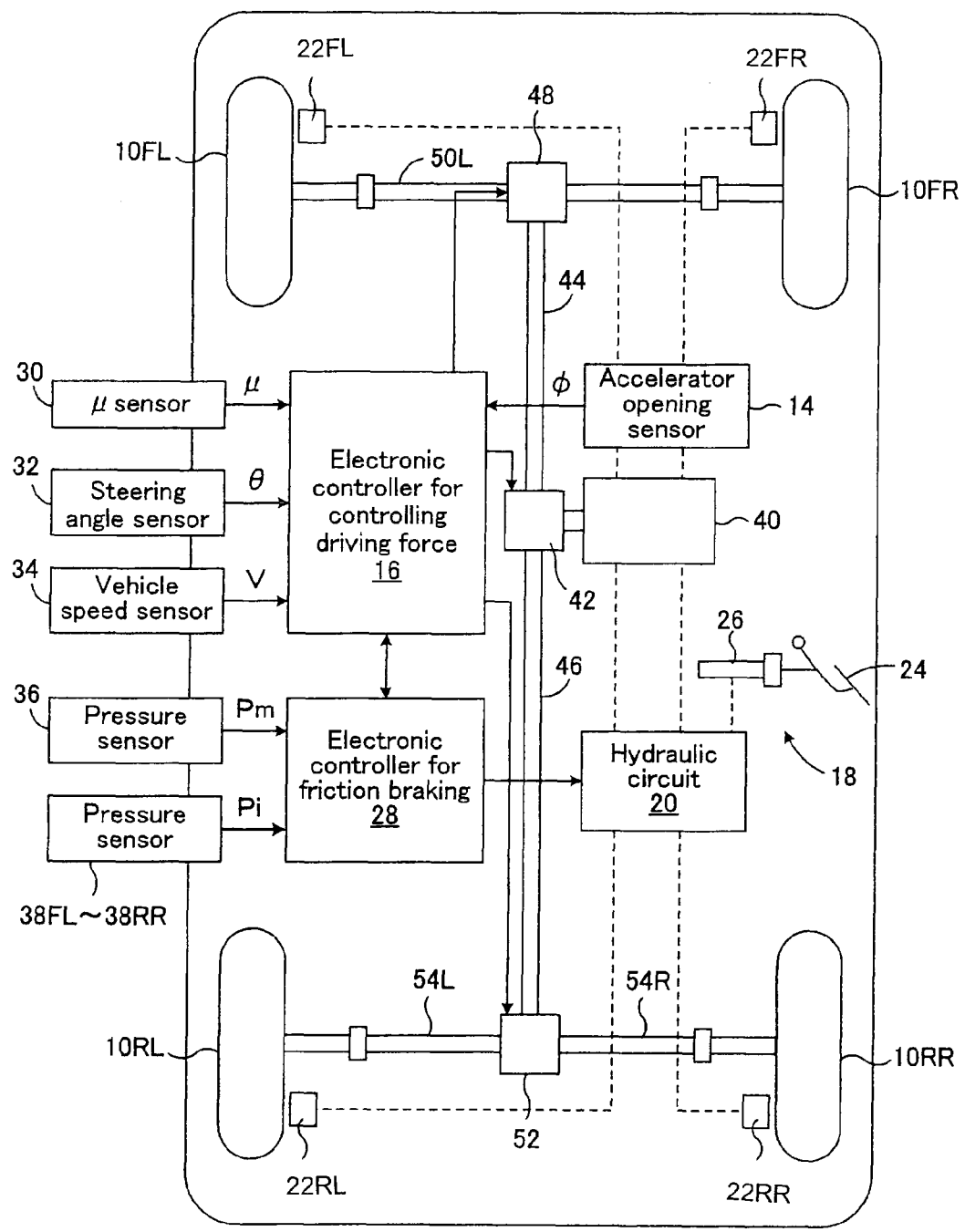
FIG. 5 is a schematic block diagram showing a vehicle braking/driving force control apparatus applied to a four-wheel-drive vehicle in which driving force and regenerative braking force from a single electric motor generator, which is common to four wheels, are controlled so as to be distributed to the four wheels according to a second embodiment of the present invention.

FIG. 5 is a schematic block diagram showing a braking/driving force control apparatus applied to a four-wheel-drive vehicle in which driving force and regenerative braking force from a single electric motor generator, which is common to four wheels, are controlled so as to be distributed to front and rear wheels and right and left wheels according to a second embodiment of the present invention. The components in FIG. 5 same as those in FIG. 1 are identified by the same numerals in FIG. 1.

In this second embodiment, an electric motor generator 40 is provided that serves as a driving source common to the front left wheel 10FL, front right wheel 10FR, rear left wheel 10RL, and rear right wheel 10RR. The driving force or the regenerative braking force from the electric motor generator 40 is transmitted to a front-wheel propeller shaft 44 and rear-wheel propeller shaft 46 through a center differential 42 that can control the distribution ratio to the front wheels and rear wheels.

The driving force or the regenerative braking force of the front-wheel propeller shaft 44 is transmitted to the front-left wheel axle 50L and front-right wheel axle 50R by a front-wheel differential 48 that can control the distribution ratio to the front-left wheel and front-right wheel, whereby the front-left wheel 10FL and front-right wheel 10FR are rotatably driven. Similarly, the driving force or the regenerative braking force of the rear-wheel propeller shaft 46 is transmitted to the rear-left wheel axle 54L and rear-right wheel axle 54R by a rear-wheel differential 52 that can control the distribution ratio of the rear-left wheel and rear-right wheel, whereby the rear-left wheel 10RL and rear-right wheel 10RR are rotatably driven.

The driving force of the electric motor generator 40 is controlled by the electronic controller 16 for controlling driving force on the basis of the accelerator opening $\phi$ detected by the accelerator opening sensor 14. The regenerative braking force of the electric motor generator 40 is also controlled by the electronic controller 16 for controlling driving force. The electronic controller 16 for controlling driving force controls the distribution ratio of the driving force and regenerative braking force to the front wheels and rear wheels by the center differential 42, controls the distribution ratio of the driving force and regenerative braking force to the left wheels and right wheels by the front-wheel differential 48, and controls the distribution ratio of the driving force and regenerative braking force to the left wheels and right wheels by the rear-wheel differential 52.

In this second embodiment too, the electronic controller 16 for controlling driving force calculates, in the same manner as in the first embodiment, the target braking/driving force Fvn, required to the vehicle, through the control of the braking/driving force of each wheel, the vehicle target yaw moment Mvn, required to the vehicle, through the control of the braking/driving force of each wheel, the vehicle maximum driving force Fvdmax, the vehicle maximum braking force Fvbmax, the vehicle maximum yaw moment Mvlmax in the leftward turning direction, and the vehicle maximum yaw moment Mvrmax in the rightward turning direction by the braking/driving force of each wheel.

In the illustrated second embodiment, it is assumed that the driving forces Fwdi of the wheels when the maximum driving force of the electric motor generator 40 is uniformly distributed to the front-left wheel 10FL, front-right wheel 10FR, rear-left wheel 10RL and rear-right wheel 10RR is smaller than the producible maximum longitudinal force that is determined by the friction coefficient μ of the normal road surface.

Figure 6A:
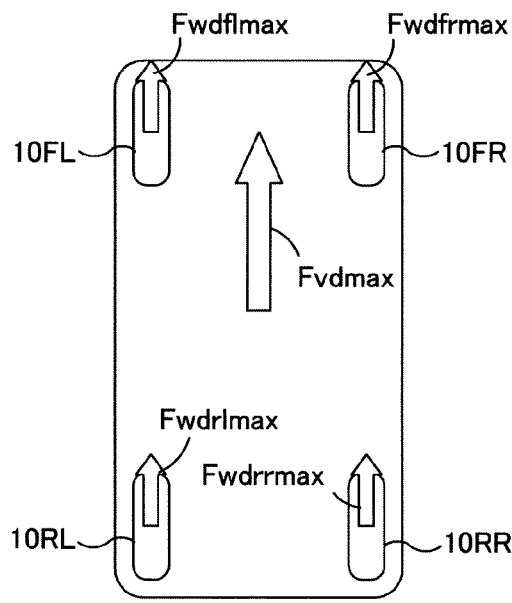
FIG. 6 is an explanatory view for explaining various cases of the relationship between braking/driving force of each wheel and vehicle braking/driving force and the relationship between braking/driving force of each wheel and vehicle yaw moment in the second embodiment.

As shown in FIG. 6A, the vehicle maximum driving force Fvdmax under the condition where the yaw moment by the braking/driving forces of the wheels is not acted on the vehicle is achieved when the braking/driving forces Fwxfl and Fwxfr of the front-left wheel 10FL and front-right wheel 10FR are the maximum driving forces Fwdflmax and Fwdfrmax in case where the distribution of the driving force to the right and left wheels is equal, and the braking/driving forces Fwxrl and Fwxrr of the rear-left wheel 10RL and rear-right wheel 10RR are the maximum driving forces Fwdrlmax and Fwdrrmax in case where the distribution of the driving force to the right and left wheels is equal.

Figure 6B:
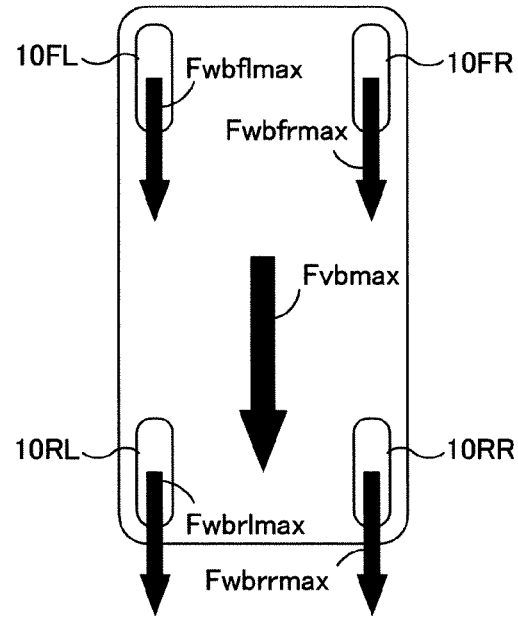

Similarly, as shown in FIG. 6B, the vehicle maximum braking force Fvbmax under the condition where the yaw moment by the braking/driving force of the wheels is not acted on the vehicle is achieved when the braking/driving forces Fwxfl and Fwxfr of the front-left wheel 10FL and front-right wheel 10FR are the maximum braking forces Fwbflmax and Fwbfrmax in case where the distribution of the braking force to the right and left wheels is equal, and the braking/driving forces Fwxrl and Fwxrr of the rear-left wheel 10RL and rear-right wheel 10RR are the maximum braking forces Fwbrlmax and Fwbrrmax in case where the distribution of the braking force to the right and left wheels is equal.

Figure 6C:
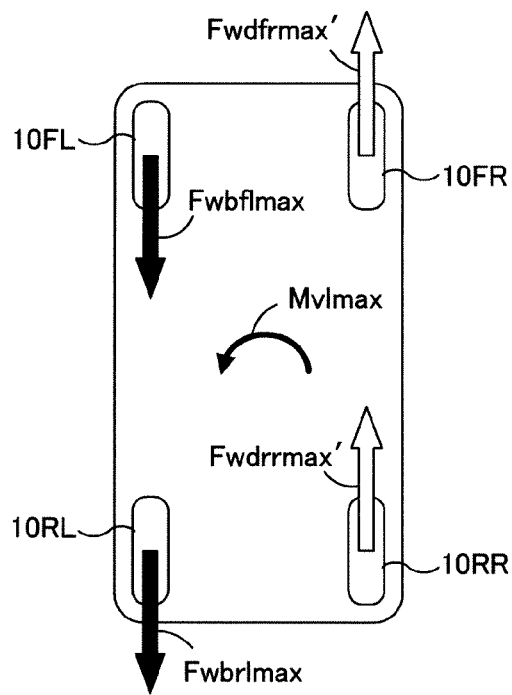

As shown in FIG. 6C, the vehicle maximum yaw moment Mvlmax in the leftward turning direction under the condition where the longitudinal force by the braking/driving forces of the wheels is not acted on the vehicle is achieved in case where the driving force is distributed to the right wheels, the braking/driving forces Fwxfr and Fwxrr of the front-right wheel 10FR and rear-right wheel 10RR are the maximum driving forces Fwdfrmax' and Fwdrrmax', and their magnitudes are equal to the magnitudes of the maximum braking forces Fwbflmax and Fwbrlmax of the front-left wheel 10FL and rear-left wheel 10RL respectively.

Figure 6D:
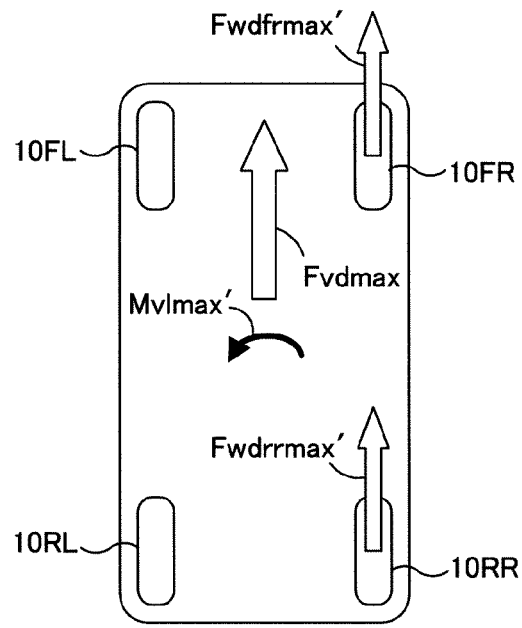

As shown in FIG. 6D, the vehicle maximum yaw moment Mvlmax' in the leftward turning direction under the condition where the vehicle braking/driving force is the maximum driving force Fvdmax is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum driving forces Fwdflmax' and Fwdrrmax'.

Figure 7E:
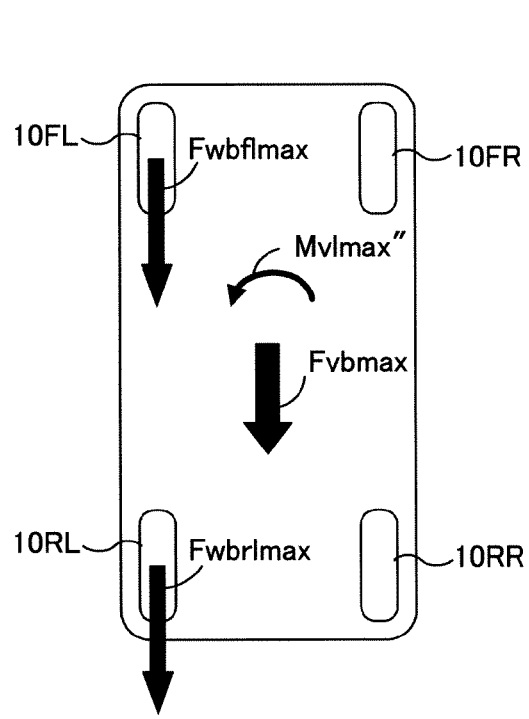
FIG. 7 is an explanatory view for explaining other various cases of the relationship between braking/driving force of each wheel and vehicle braking/driving force and the relationship between braking/driving force of each wheel and vehicle yaw moment in the second embodiment.

As shown in FIG. 7E, the vehicle maximum yaw moment Mvlmax" in the leftward turning direction under the condition where the driving force is not acted on any wheels is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum braking forces Fwbflmax and Fwbrlmax.

Figure 7F:
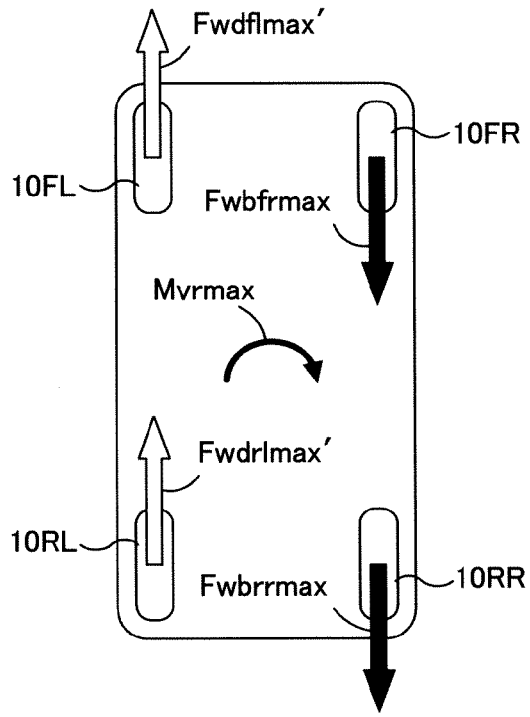

As shown in FIG. 7F, the vehicle maximum yaw moment Mvrmax in the rightward turning direction under the condition where the longitudinal force by the braking/driving forces of the wheels is not acted on the vehicle is achieved in case where the driving force is distributed to the left wheels, the braking/driving forces Fwxfl and Fwxrl of the front-left wheel 10FL and rear-left wheel 10RL are the maximum driving forces Fwdflmax' and Fwdrlmax', and their magnitudes are equal to the magnitudes of the maximum braking forces Fwbfrmax and Fwbrrmax of the front-right wheel 10FR and rear-right wheel 10RR respectively.

Figure 7G:
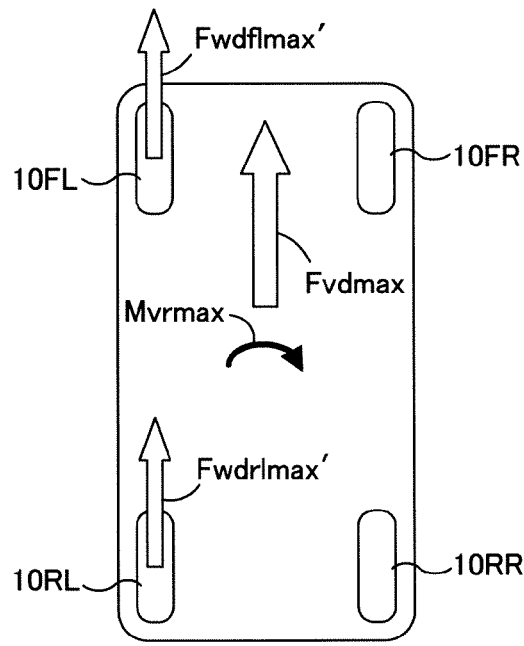

As shown in FIG. 7G, the vehicle maximum yaw moment Mvrmax' in the rightward turning direction under the condition where the vehicle braking/driving force is the maximum driving force Fvdmax is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum driving forces Fwdflmax' and Fwdrlmax'.

Figure 7H:
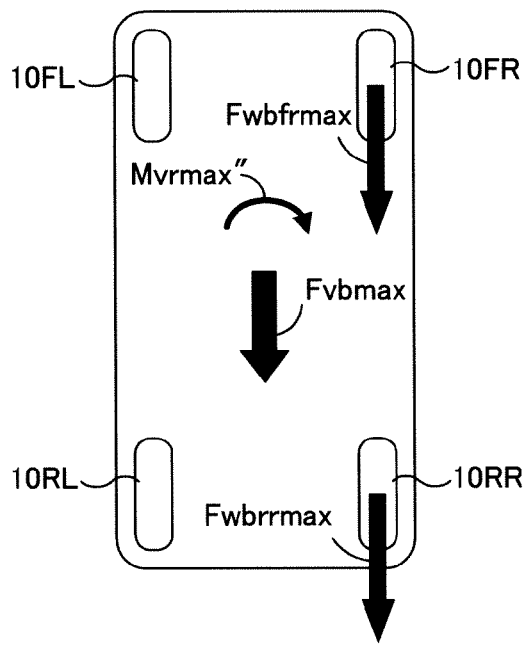

As shown in FIG. 7H, the vehicle maximum yaw moment Mvrmax" in the rightward turning direction under the condition where the driving force is not acted on any wheels is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum braking forces Fwbfrmax and Fwbrrmax.

The maximum driving forces Fwdimax of the wheels are determined by the maximum output torque of the electric motor generator 40, the road friction coefficient $\mu$, and each distribution ratio, and the maximum braking forces Fwbimax of the wheels are determined by the road friction coefficient $\mu$. Therefore, the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction are also determined by the maximum output torque of the electric motor generator 40 and the road friction coefficient $\mu$. Accordingly, if the maximum output torque of the electric motor generator 40 and the road friction coefficient $\mu$ are found, the vehicle maximum driving force Fvdmax and the other values can be estimated.

Figure 9A:
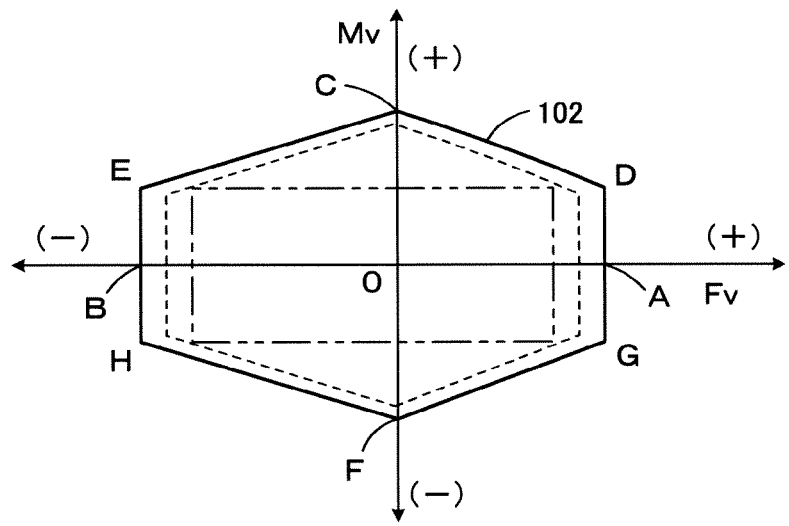
FIG. 9A is a graph showing the range, that can be achieved by the control of the braking/driving force of each wheel, of the vehicle braking/driving force and vehicle yaw moment in the second embodiment.

As shown in FIG. 9A, in a rectangular coordinate with the vehicle braking/driving force Fvx as abscissa and the vehicle yaw moment Mv as ordinate, the vehicle braking/driving force Fvx and the vehicle yaw moment Mv that are attainable by the control of the braking/driving force of each wheel take values within a hexagon 104 decided by the vehicle maximum driving force Fvdmax, vehicle maximum braking force Fvbmax, vehicle maximum yaw moment Mvlmax in the leftward turning direction, vehicle maximum yaw moment Mvrmax in the rightward turning direction, and the variable range of the vehicle yaw moment Mv when vehicle braking/driving force Fvx are the maximum driving force Fvdmax or maximum braking force Fvbmax.

Notably, in FIG. 9, points A to H correspond to the cases A to H in FIGS. 6 and 7. As shown by a broken line in FIG. 9A, the hexagon 102 becomes small as the road friction coefficient $\mu$ decreases. Further, as the magnitude of the steering angle $\theta$ increases, the lateral force of front left and front right wheels, that are steerable wheels, increases, so that the allowance of the longitudinal force becomes small. Therefore, the hexagon 102 becomes small as magnitude of the steering angle $\theta$ increases.

When the output torque of the electric motor generator 40 is sufficiently great, the maximum driving force and maximum braking force of each wheel are determined by the road friction coefficient $\mu$. Therefore, supposing that the vehicle accelerating direction and the vehicle leftward turning direction are defined as positive, the relationships between the maximum driving force and maximum braking force of each wheel, the vehicle maximum driving force and vehicle maximum braking force, and vehicle maximum yaw moment in the leftward turning direction and vehicle maximum yaw moment in the rightward turning direction are equal to those in the above-mentioned first embodiment. Accordingly, the range of the vehicle driving force and yaw moment that can be achieved by the braking/driving forces of the wheels becomes the range of the diamond like the first embodiment.

Further, when the output torque of the electric motor generator 40 and the maximum braking force of each wheel are smaller than those in the embodiment, the vehicle driving force becomes the maximum even if all the maximum driving force is distributed to the left wheels or right wheels, and the vehicle braking force becomes the maximum even if all the braking forces is distributed to the left wheels or right wheels. Therefore, as indicated by a phantom line in FIG. 9A, the range of the vehicle driving force and yaw moment that can be achieved by the braking/driving forces of the wheels becomes the range of the rectangle.

Figure 12:
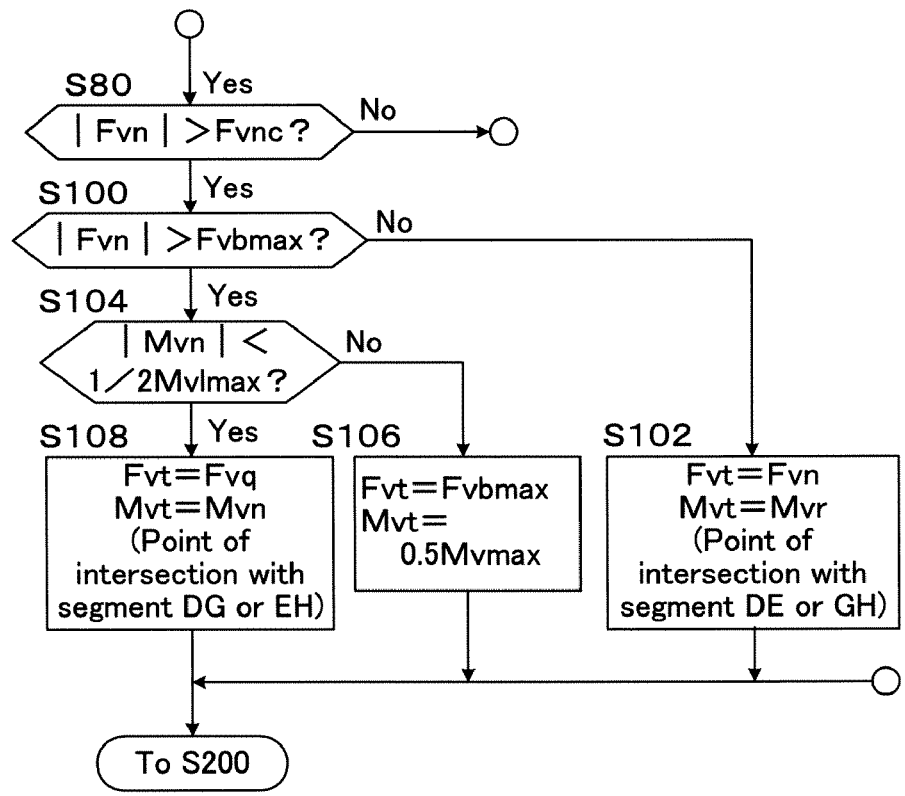
FIG. 12 is a flowchart showing an main part of a braking/driving force control routine in a fourth embodiment of a vehicle braking/driving force control apparatus that is applied to a four-wheel-drive vehicle, in which driving force and regenerative braking force from a single electric motor generator that is common to four wheels are controlled so as to be distributed to front and rear wheels and right and left wheels and is made as an modified example of the second embodiment.

The coordinates at the points A to H shown in FIG. 12 are (Fvdmax, 0), (Fvbmax, 0), (0, Mvlmax), (Fvdmax, KmMvlmax), (Fvbmax, KmMvlmax), (0, Mvrmax), (Fvdmax, −KmMvlmax), and (Fvbmax, −KmMvimax), respectively, supposing that the coefficient Km is defined as not less than 0 and not more than 1.

Supposing that the longitudinal distribution ratio of the braking/driving force Fwxi to the rear wheels is defined as Kr (constant of 0<Kr<1), the lateral distribution ratio of the braking/driving force Fwxi to the right wheels is defined as Ky ($0 \leq Kr \leq 1$) for the front wheels and rear wheels, and the vehicle tread is defined as Tr, the following equations 4 to 7 are established. Accordingly, the electronic controller 16 for controlling driving force sets the vehicle target braking/driving force Fvt and the vehicle target yaw moment Mvt after the modification by the control of the braking/driving force of each wheel to the target braking/driving force Fvn and the vehicle target yaw moment Mvn, when the vehicle target braking/driving force Fvt and the vehicle target yaw moment Mvt are within the above-mentioned hexagon 102. For example, it calculates the values satisfying the following equations 4 to 7 as the target braking/driving force Fwxti (i=fl, fr, rl, rr) and the lateral distribution ratio Ky to the right wheels by the least square method.

$$Fwxfl + Fwxfr + Fwxrl + Fwxrr = Fvt \quad (4)$$

$$\{Fwxfr + Fwxrr - (Fwxfl + Fwxrl)\} Tr/2 = Mvt \quad (5)$$

$$(Fwxfl + Fwxfr) Kr = (Fwxrl + Fwxrr)(1 - Kr) \quad (6)$$

$$(Fwxfl + Fwxrl) Ky = (Fwxfr + Fwxrr)(1 - Ky) \quad (7)$$

When the vehicle target braking/driving force Fvn and the vehicle target yaw moment Mvn are outside the range of the above-mentioned hexagon 102, the electronic controller 16 for controlling driving force determines which one of the braking/driving force and the yaw moment should take priority on the basis of the target braking/driving force Fvn and the target yaw moment Mvn by the braking/driving forces of the wheels, like the first embodiment. When determining that the yaw moment should take priority, the electronic controller 16 for controlling driving force calculates the vehicle target braking/driving force Fvt after the modification and the vehicle target yaw moment Mvt after the modification so as to attain the target yaw moment Mvn as much as possible, while when determining that the braking/driving force should take priority, it calculates the vehicle target braking/driving force Fvt after the modification and the vehicle target yaw moment Mvt after the modification so as to attain the target braking/driving force Fvn as much as possible. Then, the electronic controller 16 for controlling driving force calculates the values satisfying the foregoing equations 4 to 7 as the target braking/driving forces Fwxti of the wheels and the lateral distribution ratio Ky to the right wheels by the least square method, for example.

When the vehicle braking/driving force Fv takes a positive value which means the vehicle braking/driving force Fv is a driving force, and the target braking/driving forces Fwxti of the wheels are positive values that means the braking/driving forces Fwxti are driving forces, the electronic controller 16 for controlling driving force sets the target friction braking forces Fwbti and the target regenerative braking forces Fwrti (i=fl, fr, rl, rr) of the wheels to zero, outputs the signals indicating the target friction braking forces Fwbti to the electronic controller 28 for controlling braking force, and sets the target driving forces Fwdti (i=fl, fr, rl, rr) of the wheels to the target braking/driving forces Fwxti.

Then, the electronic controller 16 for controlling driving force calculates the target driving current It to the electric motor generator 40 and the lateral distribution ratio Ky to the right wheels by unillustrated maps or functions on the basis of the target driving forces Fwdti, and controls the driving current applied to the electric motor generator 40 on the basis of the target driving current It as well as controls the front-wheel differential 48 and the rear-wheel differential 52 on the basis of the lateral distribution ratio Ky to the right wheels, thereby controlling the driving force of each wheel such that the braking/driving forces Fwxi of the wheels becomes the target braking/driving force Fwxti.

On the other hand, when the vehicle braking/driving force Fv takes a positive value that means the vehicle braking/driving force Fv is a driving force, but the target braking/driving force Fwxti of any one of wheels takes a negative value that means it is a braking force, and when the vehicle braking/driving force Fv takes a negative value that means it is a braking force, but the target braking/driving force Fwxti of any one of wheels takes a positive value that means it is a driving force, the electronic controller 16 for controlling driving force determines the lateral distribution ratio Ky to the right wheels such that the driving force is distributed only to the side where the target braking/driving forces Fwxti take positive values, calculates the target driving current It to the electric motor generator 40 on the basis of the sum of the positive target braking/driving forces Fwxti, and outputs signals indicating the target braking/driving forces Fwxti to the electronic controller 28 for controlling braking force such that the friction braking force by the friction braking device 18 is applied to the wheel having the negative target braking/driving force Fwxti.

Then, the electronic controller 16 for controlling driving force controls the driving current applied to the electric motor generator 40 on the basis of the target driving current It, and controls the front-wheel differential 48 and the rear-wheel differential 52 on the basis of the lateral distribution ratio Ky to the right wheels. The electronic controller 28 for controlling braking force applies the friction braking force according to the target braking/driving force Fwxti to the wheel having the negative target braking/driving force Fwxti. Accordingly, the braking/driving forces Fwxi of the wheels are controlled to coincide with the target braking/driving forces Fwxti.

When the sum of the target braking/driving forces Fwxti is not more than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti and the target friction braking forces Fwbti of the wheels to 0, and sets the target regenerative braking force Frt to the sum of the target braking/driving forces Fwxti, thereby controlling the lateral distribution ratio Ky to the right wheels and the electric motor generator 40 such that the regenerative braking force becomes the target regenerative braking force Frt.

When the magnitude of the target braking/driving force Fwxti of any one of wheels is greater than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti of the wheels to 0, sets the regenerative braking force by the electric motor generator 40 to the maximum regenerative braking force, and sets the lateral distribution ratio Ky to the right wheels such that the distribution ratio of the regenerative braking force to the wheel having the greater target braking/driving force Fwxti increases.

Then, the electronic controller 16 for controlling driving force calculates, as the target friction braking forces Fwbti, the values obtained by the subtraction from the target braking/driving forces Fwxti of the wheels the associated regenerative braking forces of the wheels, and outputs the signals indicating the target friction braking forces Fwbti to the electronic controller 28 for controlling braking force. Further, the electronic controller 16 for controlling driving force controls the electric motor generator 40 such that the regenerative braking force becomes the maximum regenerative braking force, and controls the front-wheel differential 48 and the rear-wheel differential 52 on the basis of the lateral distribution ratio Ky to the right wheels.

In this second embodiment too, the electronic controller 28 for controlling braking force calculates the target braking pressures Pbti (i=fl, fr, rl, rr) of the wheels on the basis of the target friction braking forces Fwbti of the wheels inputted from the electronic controller 16 for controlling driving force, and controls the hydraulic circuit 20 such that the braking pressures Pbi of the wheels becomes the associated target braking pressures Pbti, thereby controlling such that the friction braking forces Fwbi (i=fl, fr, rl, rr) of the wheels become the associated target friction braking forces Fwbti of the wheels.

Figure 8:
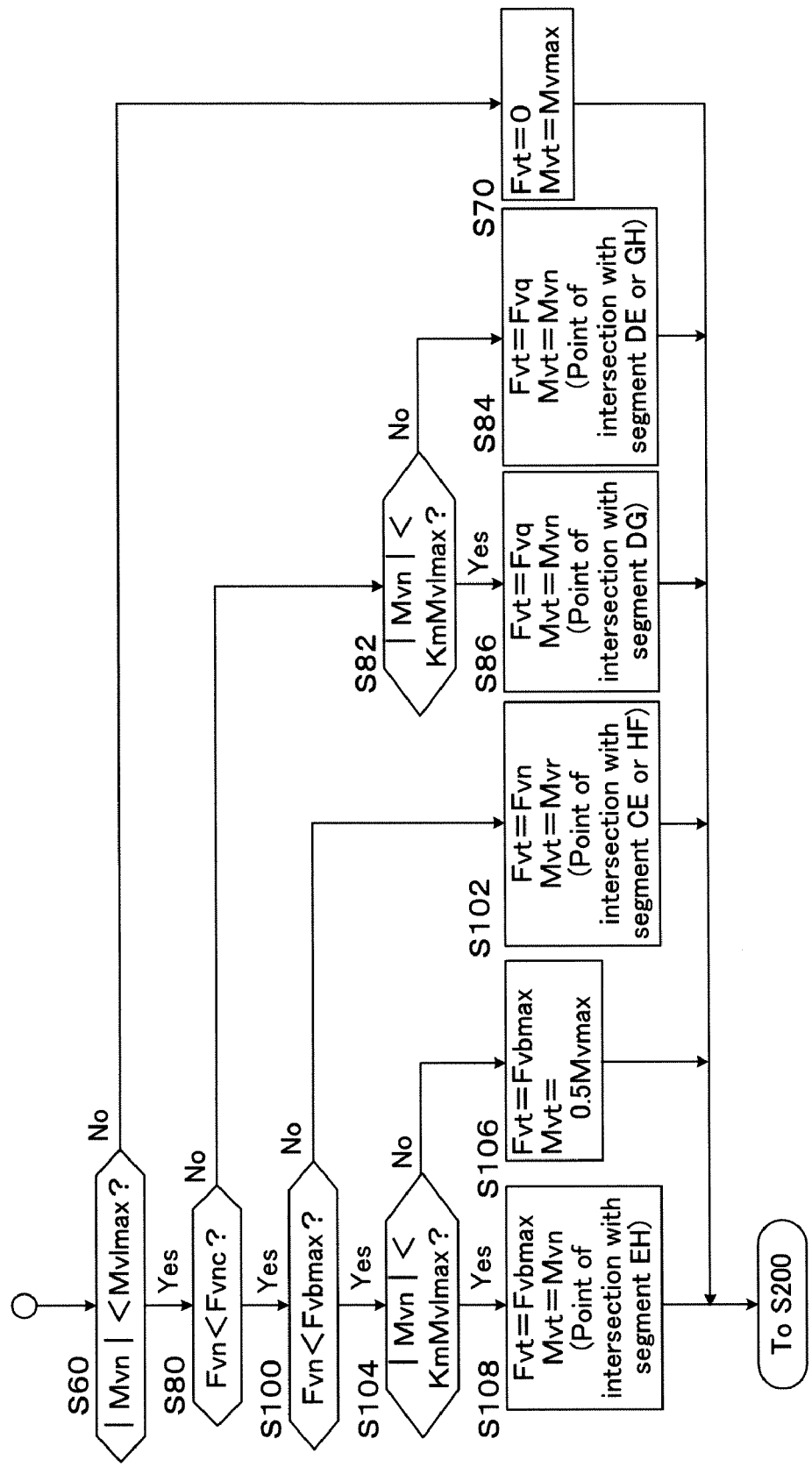
FIG. 8 is a flowchart showing a braking/driving force control routine executed by the electronic controller for controlling driving force in the second embodiment.

The braking/driving force control in the second embodiment will now be explained with reference to the flowchart shown in FIG. 8. Steps in FIG. 8 same as Steps shown in FIG. 3 are identified by the same numbers. The control by the flowchart shown in FIG. 8 is started by the activation of the electronic controller 16 for controlling driving force, and it is repeatedly executed every predetermined time until an ignition switch, not shown, is turned off.

In this second embodiment, Steps 10 to 80 and Steps 200 to 220 are executed in the same manner as in the first embodiment. When the positive determination is made at Step 80, the program proceeds to Step 100, while when the negative determination is made, the program proceeds to Step 82.

At Step 82, It is determined whether or not the absolute value of the target yaw moment Mvn is smaller than KmMvlmax. When a negative determination is made, the program proceeds to Step 84. When a positive determination is made, the program proceeds to Step 86.

Figure 9B:
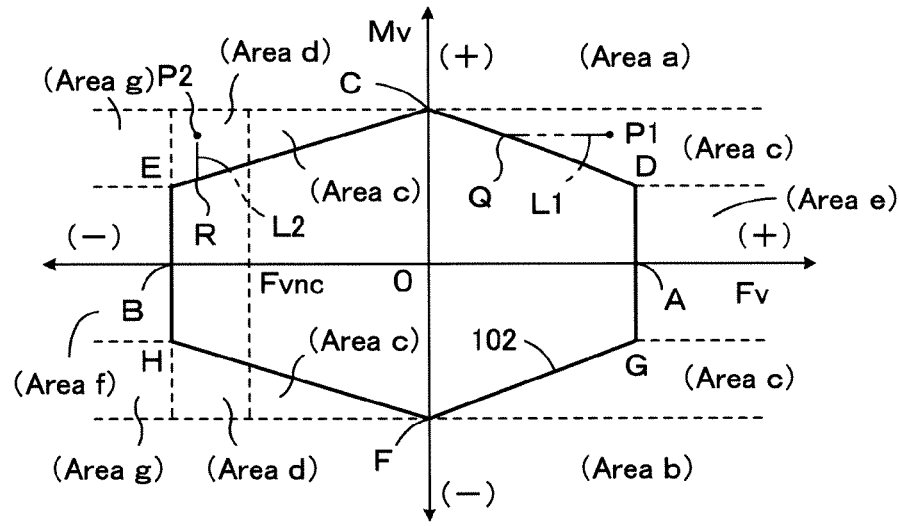
FIG. 9B is an explanatory view showing a manner of a calculation of a vehicle target braking/driving force Fvt and a vehicle target yaw moment Mvt in case where a vehicle target braking/driving force Fvn and a vehicle target yaw moment Mvn are outside the range that can be achieved by the control of the braking/driving force of each wheel in the second embodiment.
Figure 9C:
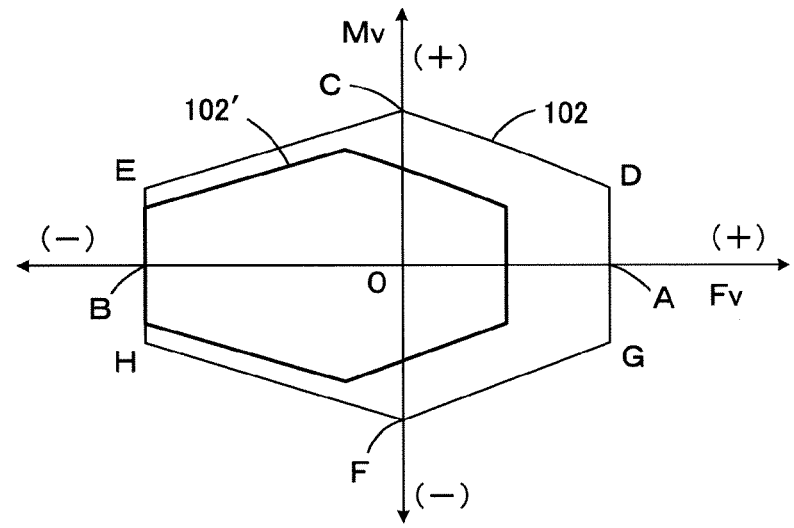
FIG. 9C is an explanatory view showing the range, that can be achieved by the control of the braking/driving force of each wheel, of the target braking/driving force Fvt and the target yaw moment Mvt in the vehicle having a driving source provided only at the right and left front wheels or at the right and left rear wheels in the second embodiment.

At Step 84, a point Q, which is closer to a point P1, of the points of intersection of a line L1, which passes the point P1 indicating the vehicle target braking/driving force Fvn and the vehicle target yaw moment Mvn and parallel to the axis of abscissa, and the outer line DE (the segment DC or CE) or GH (the segment of GF or FH) of the hexagon 102 is obtained as the target point, as shown in FIG. 9B, and if the coordinate of the target point Q is defined as (Fvq, Mvq), the vehicle target braking/driving force Fvt after the modification and the vehicle target yaw moment Mvt after the modification are set to Fvq and Mvn, respectively. Thereafter, the program proceeds to Step 200.

Similarly, at Step 86, a point, which is closer to a point indicating the target braking/driving force Fvn and the target yaw moment Mvn, of the points of intersection of a line, which passes the point indicating the vehicle target braking/driving force Fvn and the vehicle target yaw moment Mvn and parallel to the axis of abscissa, and the outer line DG of the hexagon 102 is obtained as the target point, and if the coordinate of the target point Q is defined as (Fvq, Mvq), the vehicle target braking/driving force Fvt after the modification and the vehicle target yaw moment Mvt after the modification are set to Fvq and Mvn, respectively. Thereafter, the program proceeds to Step 200.

At Step 100, the determination similar to that in the first embodiment is made. When a positive determination is made, the program proceeds to Step 104, and when a negative determination is made, the program proceeds to Step 102. At Step 102, as shown in FIG. 9B, a point R, which is closer to the point P2, of the points of intersection of a line L1, which passes the point P2 indicating the vehicle target braking/driving force Fvn and the vehicle target yaw moment Mvn and parallel to the axis of ordinate, and the outer line CE or HF of the hexagon 102 is obtained as the target point, and if the coordinate of the target point R is defined as (Fvr, Mvr), the vehicle target braking/driving force Fvt after the modification is set to the target braking/driving force Fvn and the vehicle target yaw moment Mvt after the modification is set to Mvr. Thereafter, the program proceeds to Step 200.

At Step 104, the determination similar to that in the aforesaid Step 82 is made. When a positive determination is made, the program proceeds to Step 108. When a negative determination is made, the program proceeds to Step 106 where the vehicle target braking/driving force Fvt after the modification and the vehicle target yaw moment Mvt after the modification are set to Fvbmax and KmMvmax, respectively. Thereafter, the program proceeds to Step 200. In case where the target yaw moment Mvn assumes a positive value, the vehicle target yaw moment Mvt after the modification is set to the maximum yaw moment Mvlmax in the leftward turning direction. In case where the target yaw moment Mvn assumes a negative value, the vehicle target yaw moment Mvt after the modification is set to the maximum yaw moment Mvrmax in the rightward turning direction.

At Step 108, although not shown in FIG. 9B, a point of intersection of a line, which passes the point indicating the vehicle target braking/driving force Fvn and the vehicle target yaw moment Mvn and parallel to the axis of abscissa, and the outer line EH of the hexagon 102 is obtained as the target point, and if the coordinate of the target point is defined as (Fvq, Mvq), the vehicle target braking/driving force Fvt after the modification and the vehicle target yaw moment Mvt after the modification are set to Fvq (=Fvbmax) and Mvn, respectively. Thereafter, the program proceeds to Step 200.

The control same as that in the above-mentioned first embodiment is executed at Step 210 in this second embodiment, except that the target regenerative braking force Frt and the target friction braking forces Fwbti of the wheels are calculated as described above.

Thus, in the second embodiment, when the target braking/driving force Fvn and the target yaw moment Mvn are not zero under the condition where the target braking/driving force Fvn and the target yaw moment Mvn cannot be achieved by the control of the braking/driving forces of the wheels, Steps 60 to 108 are executed. Accordingly, when the target braking/driving force Fvn and the target yaw moment Mvn are in the area a or the area b in FIG. 9B, the vehicle target braking/driving force Fvt after the modification and the vehicle target yaw moment Mvt after the modification are set to zero and the maximum yaw moment Mvmax, respectively, and when the target braking/driving force Fvn and the target yaw moment Mvn are in the area c, the vehicle target braking/driving force Fvt after the modification and the vehicle target yaw moment Mvt after the modification are set to Fvq and the target yaw moment Mvn, respectively.

When the target braking/driving force Fvn and the target yaw moment Mvn are in the area d, the vehicle target braking/driving force Fvt after the modification and the vehicle target yaw moment Mvt after the modification are set to Fvn and Mvr, respectively. When the target braking/driving force Fvn and the target yaw moment Mvn are in the area e, the vehicle target braking/driving force Fvt after the modification and the vehicle target yaw moment Mvt after the modification are set to the maximum driving force Fvdmax and KmMvmax, respectively. When the target braking/driving force Fvn and the target yaw moment Mvn are in the area f, the vehicle target braking/driving force Fvt after the modification and the vehicle target yaw moment Mvt after the modification are set to the maximum braking force Fvbmax and Mvq, respectively. When the target braking/driving force Fvn and the target yaw moment Mvn are in the area g, the vehicle target braking/driving force Fvt after the modification and the vehicle target yaw moment Mvt after the modification are set to the maximum braking force Fvbmax and KmMvmax, respectively.

Consequently, according to the illustrated second embodiment, when the vehicle, in which left and right wheels are braked and driven by an electric motor generator common to these wheels, and driving force and regenerative braking force are controlled so as to be distributed to left and right wheels, is under the condition where the target braking/driving force Fvn and the target yaw moment Mvn cannot be achieved by the control of the braking/driving forces of the wheels, it is determined which one of the braking/driving force and the yaw moment should take priority on the basis of the target braking/driving force Fvn and the target yaw moment Mvn by the braking/driving forces of the wheels required to the vehicle. When it is determined that the yaw moment should take priority, the vehicle target braking/driving force Fvt after the modification and the vehicle target yaw moment Mvt after the modification are calculated so as to attain the target yaw moment Mvn as much as possible. When it is determined that the braking/driving force should take priority, the vehicle target braking/driving force Fvt after the modification and the vehicle target yaw moment Mvt after the modification are calculated so as to attain the target braking/driving force Fvn as much as possible. Accordingly, like the aforesaid first embodiment, the braking/driving force and the yaw moment required to the vehicle can be achieved as much as possible within the ranges of the braking/driving forces that can be generated by the wheels, while satisfying as much as possible a request of turning a vehicle when the request is higher, and satisfying as much as possible a request of accelerating or decelerating the vehicle when the request is higher.

According to the illustrated second embodiment, in particular, the electric motor generator 40 that is common to all the wheels and serves as a driving source generates a regenerative braking force, in case where the vehicle target braking/driving force Fvt takes a negative value that means it is a braking force. Therefore, like the above-mentioned first embodiment, the vehicle motion energy can effectively be returned as electric energy upon the braking operation for deceleration, while achieving the braking/driving force and the yaw moment required to the vehicle as much as possible within the range of the braking/driving force that can be generated by each wheel.

According to the illustrated first and second embodiments, the vehicle target longitudinal acceleration Gxt is calculated on the basis of the accelerator opening φ and the master cylinder pressure Pm that indicate the amount of acceleration or deceleration operation by a driver, the vehicle target yaw rate γt is calculated on the basis of the steering angle θ, which is a steering operation amount by a driver, and the vehicle speed V, the target barking/driving force Fvn required to the vehicle is calculated on the basis of the vehicle target longitudinal acceleration Gxt, and the target total yaw moment Mvnt required to the vehicle is calculated on the basis of the vehicle target yaw moment γt.

The vehicle turning yaw moment Ms by the lateral force of each wheel is calculated, and the value obtained by subtracting the turning yaw moment Ms from the vehicle target total yaw moment Mvnt is calculated as the vehicle target yaw moment Mvn, which is required to the vehicle and is to be attained by the control of the braking/driving force of each wheel. Therefore, the vehicle target yaw moment required to the vehicle to be attained by the control of the braking/driving force of each wheel can be surely and correctly calculated in just proportion, compared to the case where the vehicle turning yaw moment Ms attained by the lateral forces of the wheels is not considered.

Third Embodiment

Figure 10:
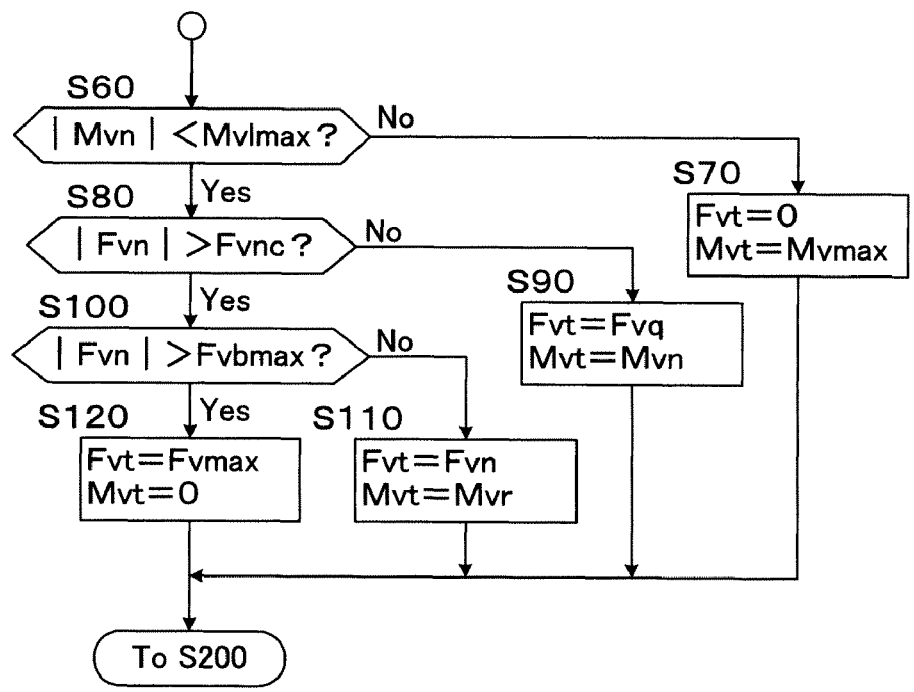
FIG. 10 is a flowchart showing an main part of a braking/driving force control routine in a third embodiment of a vehicle braking/driving force control apparatus that is applied to a four-wheel-drive vehicle of a wheel-in-motor type and is made as an modified example of the first embodiment.

FIG. 10 is a flowchart showing an main part of a braking/driving force control routine in a third embodiment of a vehicle braking/driving force control apparatus that is applied to a four-wheel-drive vehicle of a wheel-in-motor type and is made as an modified example of the first embodiment. Steps in FIG. 10 same as Steps shown in FIG. 3 are identified by the same numbers in FIG. 3.

In this third embodiment, it is determined at Step 80 whether or not the absolute value of the target braking/driving force Fvn is greater than a reference value Fvnc (a positive constant smaller than Fvdmax). When a positive determination is made, the program proceeds to Step 100, and when a negative determination is made, the program proceeds to Step 90.

At Step 100, it is determined whether or not the absolute value of the vehicle target braking/driving force Fvn is greater than the vehicle maximum braking force Fvbmax. When a negative determination is made, the program proceeds to Step 110, and when a positive determination is made, the program proceeds to Step 120.

At Step 120, the vehicle target braking/driving force Fvt after the modification is set to the maximum braking/driving force Fvmax and the vehicle target yaw moment Mvt after the modification is set to zero. Thereafter, the program proceeds to Step 200. In this case, the vehicle target braking/driving force Fvt after the modification is set to the maximum driving force Fvdmax when the target braking/driving force Fvn assumes a positive value, while it is set to the maximum braking force Fvbmax when the target braking/driving force Fvn assumes a negative value.

Figure 11:
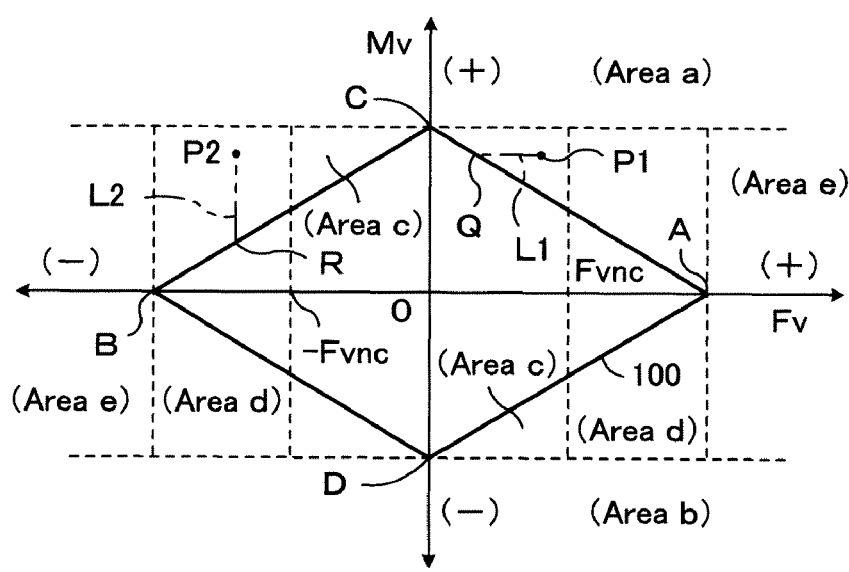
FIG. 11 is an explanatory view showing a manner of a calculation of a vehicle target braking/driving force Fvt and a vehicle target yaw moment Mvt in case where a vehicle target braking/driving force Fvn and a vehicle target yaw moment Mvn are outside the range that can be achieved by the control of the braking/driving force of each wheel in the third embodiment.

Thus, according to the third embodiment, the areas a to e corresponding to those in FIG. 4B are as illustrated in FIG. 11. Accordingly, the operation and effect same as those in the first embodiment can be obtained, and additionally, under the condition where there is a request of a higher driving force required to the vehicle compared to the case of the first embodiment, this request can be satisfied as much as possible.

Fourth Embodiment

FIG. 12 is a flowchart showing an main part of a braking/driving force control routine in a fourth embodiment of a vehicle braking/driving force control apparatus that is applied to a four-wheel-drive vehicle, in which driving force and regenerative braking force from a single electric motor generator that is common to four wheels are controlled so as to be distributed to front and rear wheels and right and left wheels and is made as an modified example of the second embodiment. Steps in FIG. 12 same as Steps shown in FIG. 8 are identified by the same numbers in FIG. 8.

Figure 13:
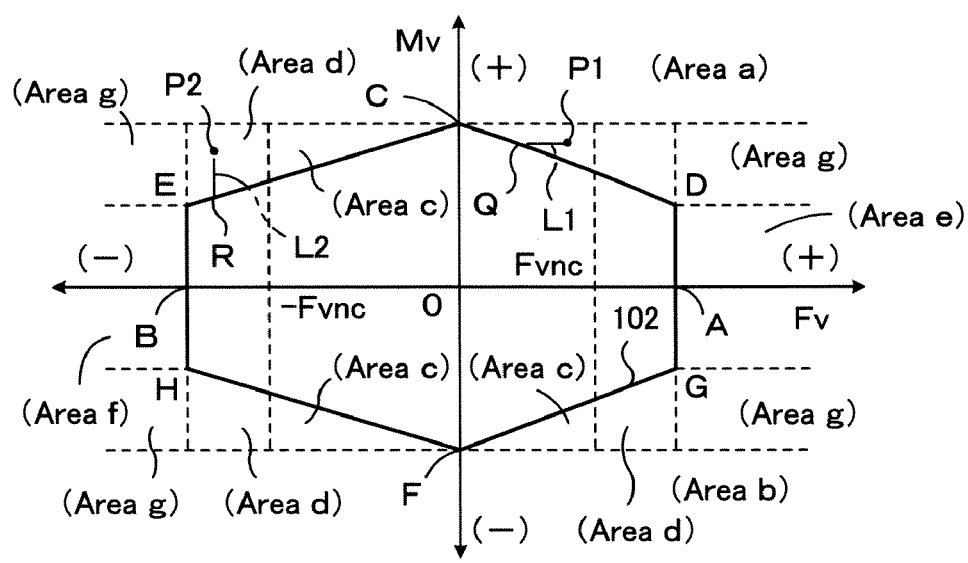
FIG. 13 is an explanatory view showing a manner of a calculation of a vehicle target braking/driving force Fvt and a vehicle target yaw moment Mvt in case where a vehicle target braking/driving force Fvn and a vehicle target yaw moment Mvn are outside the range that can be achieved by the control of the braking/driving force of each wheel in the fourth embodiment.

In this fourth embodiment, Steps 80 to 100 are executed in the same manner as in the third embodiment. When a negative determination is made at Step 100, at Step 102, a point R, which is closer to the point P2, of the points of intersection of a line L2, which passes the point P2 indicating the vehicle target braking/driving force Fvn and the vehicle target yaw moment Mvn and is parallel to the axis of ordinate, and the outer line DE (the segment DC or CE) or GH (the segment of GF or FH) of the hexagon 102 is obtained as the target point, as shown in FIG. 13, and if the coordinate of the target point R is defined as (Fvr, Mvr), the vehicle target braking/driving force Fvt after the modification is set to the target braking/driving force Fvn and the vehicle target yaw moment Mvt after the modification is set to Mvr. Thereafter, the program proceeds to Step 200.

When a positive determination is made at Step 104, although not shown in FIG. 13, a point of intersection of a line, which passes a point indicating the vehicle target braking/driving force Fvn and the vehicle target yaw moment Mvn and is parallel to the axis of abscissa, and the outer line DG or EH of the hexagon 102 is obtained as the target point, and if the coordinate of the target point is defined as (Fvq, Mvq), the vehicle target braking/driving force Fvt after the modification and the vehicle target yaw moment Mvt after the modification are is set to Fvq and Mvn, respectively. Thereafter, the program proceeds to Step 200.

Thus, according to the fourth embodiment, the areas a to g corresponding to those in FIG. 9B are as illustrated in FIG. 13. Accordingly, the operation and effect same as those in the second embodiment can be obtained, and additionally, under the condition where there is a request of a higher driving force required to the vehicle compared to the case of the first embodiment, this request can be satisfied as much as possible.

Although the reference value Fvnc for the determination of the braking/driving force at Step 80 is the same for both of the driving force and braking force in the third and fourth embodiments, this reference value may be set so as to be different in the driving force and braking force.

Although the driving source is the electric motor generator 40 that is common to four wheels in the illustrated second and fourth embodiments, the driving source for driving the wheels so as to execute the control of the driving force distribution between left and right wheels may be optional driving means known by a person skilled in the art, such as an internal combustion engine, hybrid system, or the like.

Although a single electric motor generator 40 is provided as a common driving source to four wheels in the illustrated second and fourth embodiments, a driving source common to the front-left wheel and front-right wheel and a driving source common to the rear-left wheel and rear-right wheel may be provided. Further, a driving source common to only the front-left wheel and front-right wheel or a driving source common to only the rear-left wheel and rear-right wheel may be provided. In this case, the hexagon 102 takes a shape 102' shown in FIG. 9C. Specifically, when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved by this vehicle.

The present invention is explained in detail with respect to specific embodiments, but the invention is not limited to the above-mentioned embodiments. It would be apparent for a person skilled in the art that various other modifications are possible within the scope of the present invention.

For example, although the regenerative braking force is generated according to need by the electric motor generators 12FL to 12RR and the electric motor generator 40 in the aforesaid first to fourth embodiments, it may be revised such that the regenerative braking is not performed, even if the driving source is an electric motor generator, and the braking force is generated only by the friction braking.

The longitudinal distribution ratio Kr of the braking/driving force to the rear wheels is constant in the aforesaid first to fourth embodiments. However, the longitudinal distribution ratio Kr to the rear wheels may be variably set in accordance with the magnitude of the steering angle such that the longitudinal distribution ratio Kr to the rear wheels gradually increases as the magnitude of the steering angle increases, since in general, the lateral force of the steerable wheel increases and the allowable longitudinal force of the steerable wheel decreases as the magnitude of the steering angle increases.

In general, as the braking forces of the rear wheels increase upon the braking of the vehicle for deceleration, the lateral force of the rear wheels decreases to thereby deteriorate the running stability of the vehicle. Therefore, the longitudinal distribution ratio Kr to the rear wheels may be variably set in accordance with the vehicle target braking/driving force such that it decreases as the vehicle target braking/driving force takes a negative value and its magnitude is greater.

In the aforesaid first to fourth embodiments, it is determined which one of the braking/driving force and the yaw moment should take priority on the basis of the target braking/driving force Fvn and the target yaw moment Mvn, and when the braking/driving force should take priority, the braking/driving forces of the wheels are controlled so as to attain the target braking/driving force Fvn as mush as possible, and when the yaw moment should take priority, the braking/driving forces of the wheels are controlled so as to attain the target yaw moment Mvn as mush as possible. However, the configuration may be revised such that the braking/driving force or the yaw moment should take priority according to the setting position of a switch operated by a driver, for example.

Although the reference value Fvnc is a constant in the aforesaid first to fourth embodiments, the reference value may be revised, for example, so as to be variably set according to the target braking/driving force Fvn or the target yaw moment Mvn or the driving operation of a driver, in such a manner that the magnitude thereof decreases as the rate of change of the target braking/driving force Fvn is high and the magnitude thereof increases as the rate of change of the target yaw moment Mvn is high.

In the aforesaid first to fourth embodiments, the target braking/driving force Fvn and the target yaw moment Mvn by the control of the braking/driving force of each wheel required to the vehicle are calculated on the basis of the acceleration/deceleration operation amount and the steering operation amount by the driver. However, in case where the vehicle behavior is unstable, the target braking/driving force Fvn and the target yaw moment Mvn may be corrected so as to be calculated by considering the target longitudinal acceleration or target yaw rate, which are required to stabilize the behavior of the vehicle, in addition to the acceleration/deceleration operation amount and the steering operation amount by the driver.

What is claimed is:

1. A vehicle braking/driving force control apparatus comprising:
braking/driving force applying means that can apply braking/driving forces to wheels;
means for detecting an amount of driving operation by an occupant;
means for calculating a vehicle first target braking/driving force and a vehicle first target yaw moment, which should be generated by the braking/driving forces of the wheels, based at least on the amount of driving operation by an occupant;

determining means that determines a priority between a braking/driving force and a yaw moment when either said first target braking/driving force exceeds a maximum braking/driving force attainable by the braking/driving forces of the wheels or said first target yaw moment exceeds a maximum yaw moment attainable by the braking/driving forces of the wheels, wherein:

said determining means assigns the priority to the yaw moment when a magnitude of said first target yaw moment is less than a magnitude of the maximum yaw moment attainable by the braking/driving forces of the wheels, and when said first target braking/driving force is not less than a determination reference value, and said determining means assigns the priority to the braking/driving force when the magnitude of the first target yaw moment is less than the magnitude of the maximum yaw moment attainable by the braking/driving forces of the wheels, and when said first target braking/driving force is less than said determination reference value;

modifying means for modifying the first target braking/driving force and the first target yaw moment into a second target braking/driving force and a second target yaw moment, respectively, such that when the determining means assigns the priority to the yaw moment:

the second target braking/driving force is not greater than the maximum braking/driving force attainable by the braking/driving forces of the wheels, and the second target yaw moment is as close to the first target yaw moment as possible without exceeding the maximum yaw moment attainable by the braking/driving forces of the wheels; and control means for controlling the braking/driving force applied to each wheel by said braking/driving force applying means such that the vehicle braking/driving force becomes the second target braking/driving force and the vehicle yaw moment becomes the second target yaw moment through the control of the braking/driving forces of the wheels.

2. The vehicle braking/driving force control apparatus according to claim 1, such that when the magnitude of said first target yaw moment is not less than the magnitude of the maximum yaw moment attainable by the braking/driving forces of the wheels, said modifying means sets the second target yaw moment equal to said maximum yaw moment attainable by the braking/driving forces of the wheels.

3. The vehicle braking/driving force control apparatus according to claim 2, such that when the magnitude of said vehicle first target yaw moment is less than the maximum yaw moment attainable by the braking/driving forces of the wheels, the modifying means sets the second target yaw moment equal to the first target yaw moment.

4. The vehicle braking/driving force control apparatus according to claim 2, such that when a magnitude of said first target braking/driving force is not more than said maximum braking/driving force attainable by the braking/driving forces of the wheels, the modifying means sets the second target braking/driving force equal to the first target braking/driving force.

5. The vehicle braking/driving force control apparatus according to claim 1, such that when the magnitude of said first target yaw moment is less than the maximum yaw moment attainable by the braking/driving force of the wheels:

the first target braking/driving force and the first target yaw moment define coordinates of a reference point in a rectangular coordinate with the vehicle braking/driving force and the vehicle yaw moment as coordinate axes, a straight line in the rectangular coordinate runs parallel to the braking/driving force coordinate axis and intersects the reference point, a locus of points pairing all maximum yaw moments attainable by the braking/driving forces at the wheels with a corresponding maximum braking/driving force attainable by the braking/driving forces at the wheels defines a boundary in the rectangular coordinate, an intersection of the straight line with the boundary defines a target point, the modifying means sets the second target yaw moment equal to a yaw moment coordinate of the target point, and the modifying means sets the second target braking driving force equal to a braking driving force coordinate of the target point.

6. The vehicle braking/driving force control apparatus according to claim 5, wherein the boundary in the rectangular coordinate comprises points with coordinates of a greatest value of the vehicle driving force, a greatest value of the vehicle braking force, a greatest value of the vehicle yaw moment in the leftward turning direction, and a greatest value of the vehicle yaw moment in the rightward turning direction.

7. The vehicle braking/driving force control apparatus according to claim 5, wherein the boundary in the rectangular coordinate is set in accordance with a road friction coefficient.

8. The vehicle braking/driving force control apparatus according to claim 1, wherein said means for calculating the first target braking/driving force and the first target yaw moment:

calculates said first target braking/driving force and a vehicle target total yaw moment for causing the vehicle to stably run on the basis of at least the amount of the driving operation by an occupant, estimates a vehicle turning yaw moment due to a lateral force of each wheel on the basis of at least the amount of the driving operation by the occupant, and calculates the first target yaw moment by subtracting said turning yaw moment from said target total yaw moment.

9. The vehicle braking/driving force control apparatus according to claim 8, wherein said means for calculating the vehicle first target braking/driving force and the vehicle first target yaw moment calculates:

a vehicle target longitudinal acceleration and a vehicle target yaw rate for stably running the vehicle on the basis of at least the amount of the driving operation by an occupant, and said first target braking/driving force and the first target yaw moment on the basis of said vehicle target longitudinal acceleration and said vehicle target yaw rate, respectively.

10. The vehicle braking/driving force control apparatus according to claim 1, such that when the magnitude of the first target yaw moment is not less than the magnitude of the maximum yaw moment attainable by the braking/driving forces of the wheels, the determining means assigns the priority to the yaw moment.

11. The vehicle braking/driving force control apparatus according to claim 1, such that when a magnitude of the first target braking/driving force is not less than the magnitude of the maximum braking/driving force attainable by the braking/driving forces of the wheels, the determining means assigns the priority to the braking/driving force.

12. The vehicle braking/driving force control apparatus according to claim 1, wherein
said control means calculates the target braking/driving force of each wheel on the basis of said second target braking/driving force, said second target yaw moment, and a distribution ratio of the braking/driving force between the front and rear wheels, and
said control means controls the braking/driving force applied to each wheel on the basis of the target braking/driving force of each wheel.

* * * * *